United States Patent
Nakura et al.

(10) Patent No.: US 6,860,643 B2
(45) Date of Patent: Mar. 1, 2005

(54) OPTICAL CONNECTOR WITH A SURFACE MOUNTED SHIELD

(75) Inventors: Yuji Nakura, Nagoya (JP); Hitoshi Imazu, Nagoya (JP); Kazuhiro Asada, Nagoya (JP)

(73) Assignees: Autonetworks Technologies, Limited, Mie (JP); Sumitomo Wiring Systems, Limited, Mie (JP); Sumitomo Electric Industries, Limited, Osaka (JP)

( * ) Notice: Subject to any disclaimer, the term of this patent is extended or adjusted under 35 U.S.C. 154(b) by 0 days.

(21) Appl. No.: 10/681,299

(22) Filed: Oct. 9, 2003

(65) Prior Publication Data

US 2004/0071406 A1 Apr. 15, 2004

Related U.S. Application Data

(62) Division of application No. 10/109,684, filed on Apr. 1, 2002.

(30) Foreign Application Priority Data

| Apr. 3, 2001 | (JP) | ........................................ 2001-104367 |
| Apr. 3, 2001 | (JP) | ........................................ 2001-104426 |
| Apr. 4, 2001 | (JP) | ........................................ 2001-105479 |
| Jun. 12, 2001 | (JP) | ........................................ 2001-176540 |

(51) Int. Cl.[7] ............................... G02B 6/38; G02B 6/36
(52) U.S. Cl. ............................... 385/63; 385/88; 385/92; 385/53
(58) Field of Search ............................... 385/53, 56, 63, 385/69, 75, 88, 92

(56) References Cited

U.S. PATENT DOCUMENTS

| 4,477,134 A | 10/1984 | Wright |
| 4,539,476 A | 9/1985 | Donuma et al. |
| 4,737,008 A | 4/1988 | Ohyama et al. |
| 4,840,451 A | * 6/1989 | Sampson et al. .............. 385/89 |
| 5,005,939 A | 4/1991 | Arvanitakis et al. |
| 5,137,959 A | 8/1992 | Block et al. |
| 5,231,685 A | 7/1993 | Hanzawa et al. |
| 5,233,676 A | * 8/1993 | Yonemura et al. ............ 385/88 |
| 5,259,053 A | 11/1993 | Schaffer et al. |
| 5,475,783 A | 12/1995 | Kurashima |
| 5,763,900 A | 6/1998 | Wang |
| 6,040,362 A | 3/2000 | Mine et al. |
| 6,096,414 A | 8/2000 | Young |
| 6,169,142 B1 | 1/2001 | Nakano et al. |
| 6,333,967 B1 | 12/2001 | Osaka et al. |

FOREIGN PATENT DOCUMENTS

| DE | 196 37 743 A1 | 3/1998 |
| EP | 0 320 214 A2 | 6/1989 |

(List continued on next page.)

OTHER PUBLICATIONS

"Electrically conductive silicon rubber compsn. –comprises poly:di:organo siloxane(s), conductive particles poly:organo hydrogen:siloxane and platinum" Derwent, XP002169929, abstract.

*Primary Examiner*—Chandrika Prasad
(74) *Attorney, Agent, or Firm*—Oliff & Berridge, PLC

(57) ABSTRACT

An optical connector is constituted of a connector housing, a shielding case, and optical elements. The shielding case is split into a case main body section and a heatsink mechanism section, both joined together to constitute housing recesses. While the case main body section and the heatsink mechanism section are joined together, element main body sections are held between them. A non-joint plane of the heatsink mechanism section is housed in a case housing recess of the connector housing in an outwardly exposed state. A corrugated heatsink fin section is formed in the non-joint plane. The housing recesses into which the element main body sections are to be housed are partitioned from each other.

6 Claims, 15 Drawing Sheets

FOREIGN PATENT DOCUMENTS

| | | |
|---|---|---|
| EP | 0 524 406 A1 | 1/1993 |
| EP | 0 646 816 A2 | 4/1995 |
| GB | 2 345 799 A | 7/2000 |
| JP | 01 169416 | 7/1989 |
| JP | 02 186309 | 7/1990 |
| JP | 03 216607 | 9/1991 |
| JP | 04 120759 A | 4/1992 |
| JP | 5-3330 | 1/1993 |
| JP | 07 207160 | 8/1995 |
| JP | 09 061677 | 3/1997 |
| JP | 11 214716 | 8/1999 |
| JP | 3067249 | 3/2000 |
| WO | WO 00 79856 A1 | 12/2000 |

\* cited by examiner

OPTICAL CONNECTOR WITH A SURFACE MOUNTED SHIELD

This is a Division of application Ser. No. 10/109,684 filed Apr. 1, 2002. The entire disclosure of the prior application is hereby incorporated by reference herein in its entirety.

BACKGROUND OF THE INVENTION

1. Field of Invention

The present invention relates to an optical connector, an optical element holding structure, and a structure of a mount section of an optical connector to be employed in the field of optical communication such as that used in office automation, factory automation, and vehicle-mounted equipment.

2. Description of Related Art

An optical connector which is to be fixedly mounted on a mount board while incorporating optical elements has been improved in terms of a noise resistance characteristic of optical elements for withstanding external noise. In order to suppress radiation noise origination from the optical elements, the optical elements are built into a connector housing while being housed in a shielding shell made of highly conductive material, such as metal.

FIGS. 31 and 32 show conceivable constructions for grounding a shielding shell of an optical connector of this type.

In an optical connector 101 shown in FIG. 31, a lead terminal 106 is provided at right angles on a shielding shell 102 for sheathing an optical element D, so as to project downward beyond a connector housing 105. While the optical connector 101 is mounted on a mount board 108, the lead terminal 106 penetrates through the mount board 108 and is soldered to a trace formed on a lower surface of the mount board 108 for grounding purposes. As a result, the shielding shell 102 is grounded by way of the lead terminal 106.

The technique described in Japanese Patent Publication No. Hei. 5-3330 is exemplary of a related-art technology analogous to that mentioned above.

In an optical connector 110 shown in FIG. 32, ground tab pieces 113 are formed on both sides of a shielding shell 112 so as to jut outward from both sides of a main body section of a connector housing 115. The optical connector 110 is fixedly mounted on a mount board 118 such that the tab pieces 113 are brought, in an overlapped manner, into plane contact with ground traces 119 formed on an upper surface of the mount board 118. As a result, the shielding shell 112 is grounded by way of the tab pieces 113.

However, in the case of the optical connector 101 shown in FIG. 31, the shielding shell 102 is merely grounded by way of the pin-shaped lead terminal 106. Hence, high ground resistance arises, and an insufficient electromagnetic shielding effect is achieved.

Moreover, in this related-art and the similar related-art thereof, an optical element is fittingly inserted into a housing recess formed in a metal case; an opening of the housing recess is formed so as to become slightly larger than the element main body so that the element main body of the optical element can be fitted into the recess.

Accordingly, there is a chance of a slight clearance arising between an interior surface of the housing recess of the metal case and an exterior surface of the element main body. Such a clearance may, in turn, cause a drop in heat transfer efficiency.

In the case of the optical connector 110 shown in FIG. 32, the tab pieces 113 are brought into plane contact with the ground traces 119. Hence, low ground resistance arises, and a sufficient electromagnetic shielding effect is achieved. However, the ground tab pieces 113 significantly jut outward from both sides of the main body section of the connector housing 115. Hence, it becomes necessary to use a large area for fixedly mounting the connector 101.

SUMMARY OF THE INVENTION

The present invention has been conceived in light of the above problems and is aimed at providing an optical connector and an optical element holding structure which are superior in countermeasures against heat as well as against noise.

Another aim of the present invention is to provide a structure to be used for mounting an optical connector and provision of an optical connector, which enable minimizing of ground resistance of a shielding shell and minimizing of an area required for mounting an optical connector.

The first aspect of this invention is an optical connector including: a conductive shielding case which is to be used for connection with a ground circuit and has a housing recess; an element main body section of an optical element to be fittingly housed into the housing recess; lead terminals of the optical element which are arranged so as to project from the housing recess; and a connector housing having a case housing recess into which the shielding case is to be housed, wherein the shielding case is formed in a split structure from a casing main body section and a closure section, which constitute the housing recess when joined together; and wherein, while the case main body section and the closure section are joined together, the element main body section is placed in the housing recess and sandwiched and held between the case main body section and the closure section.

A non-joint plane opposite to a joint plane of the closure section to be connected to the case main body section may be housed in the connector housing in an outwardly exposed state, and a corrugated heatsinking fin section may be provided in the non-joint plane.

The optical element may be embodied as a plurality of optical elements, and housing recesses into which the optical elements are to be housed may be formed in the case main body section independently and side by side while being partitioned from each other.

The case main body section and the closure section may be formed from metal material or conductive resin.

Another aspect of this invention is an optical connector in which the element main body sections of the optical elements are housed in housing recesses formed in a connector housing and in which lead terminals of the optical elements project from the housing recesses, wherein the connector housing is made of a conductive material and is formed in a split structure from a housing main body section and a closure section, which constitute the housing recesses when joined together; and wherein, while the housing main body section and the closure section are joined together, the element main body sections are placed in the housing recesses and sandwiched and held between the case main body section and the closure section.

Preferably, a corrugated heatsink fin is formed in a non-joint plane of the closure section opposite a joint plane thereof to be joined to the housing main body section.

Further, the closure section may be formed from metal material.

Another aspect of this invention is an optical element holding structure of a shielding case including: a case main body section of the shielding case to be housed into a case housing recess formed in a connector housing of an optical connector; an element main body section of an optical element which is to be fitted into the case main body section; and lead terminals of the optical element which are held while projecting from the case main body section, the structure comprising: a thermal conductive material assuming the form of a gel or liquid which is filled and poured into a clearance existing between an internal circumferential surface of the case main body section and an outer circumferential surface of the element main body section, exclusive of the position of a window for optical communication formed in the case main body section, and which is set.

Alternatively, the technical means may be embodied as an optical element holding structure of a shielding case including: a case main body section of the shielding case to be housed into a case housing recess formed in a connector housing of an optical connector; an element main body section of an optical element which is to be fitted into the case main body section; and lead terminals of the optical element which are held while projecting from the case main body section, the structure comprising: a spring piece section which is provided integrally on or separately from at least one side surface of an internal circumferential surface of a case main body section and which presses an element main body section against another side surface of the internal circumferential surface.

Preferably, the spring piece section is provided at a position on the internal circumferential surface opposite to the window formed in the case main body section.

Preferably, a portion of the element main body section to be pressed by the spring piece section is situated in the vicinity of a heat source of an element main body section.

Further preferably, the spring piece section is provided in the case main body section in a collapsed and extended manner by way of an opening edge of the case main body section into which the element main body section is to be fitted.

Preferably, a clearance existing between an internal circumferential surface of a case main body section and an outer circumferential surface of an element main body section, exclusive of the position of an optical communication window formed in the case main body section, is filled with thermal conductive material assuming the form of a gel or liquid, and the thus-filled thermal conductive material is set.

Further preferably, an elastic member is interposed in a compressed state in a clearance existing between an internal circumferential surface of a case main body section and an outer circumferential surface of an element main body section, exclusive of the position of an optical communication window formed in the case main body section.

Another aspect of this invention is a structure of a mount section of an optical connector including: a connector housing in which a housing recess section is formed so as to open in a bottom surface; and a metal shielding shell having an element housing case section which is housed and arranged in the housing recess section while holding an optical element therein, the mount section comprising: a plate-shaped grounding piece which is provided so as to extend along the bottom surface of the connector housing and is formed integrally in the element housing case section; and a ground trace which is formed on the mount board and with which the grounding piece is electrically connected as a result of the grounding piece being interposed between the connector housing and one surface of the mount board while the optical connector is fixedly mounted on the one surface of the mount board.

According to another aspect of the invention, the metal shielding shell may have a heatsink section, at least a part of which is exposed outside of the connector housing, and the grounding piece may act as a member for joining the element housing case to the heatsink section at a bottom surface side of the connector housing.

According to another aspect of the invention, the grounding piece may be in plane contact with a ground trace formed on the one surface of the mount board.

According to another aspect of the invention, a screw may be inserted into the mount board and the grounding piece from the other side of the mount board and screw-engaged with the connector housing through fastening.

According to another aspect of the invention, a metal screw may be inserted into the mount board and the grounding piece from the other side of the mount board and screw-engaged with the connector housing through fastening while remaining in electrical connection with the ground trace formed on the other side of the mount board and in electrical connection with the grounding piece.

Another aspect of the invention is an optical connector comprises: a connector housing in which a housing recess section is formed so as to open in a bottom surface; a metal shielding shell having an element housing case section which is housed and arranged in the housing recess section while holding an optical element therein; and a plate-shaped grounding piece which is provided so as to extend along the bottom surface of the connector housing and is electrically connectable to a ground trace formed on the mount board, the grounding piece being formed integrally in the element housing case section.

DETAILED DESCRIPTION OF PREFERRED EMBODIMENTS

The First Preferred Embodiment-

Figure 1:
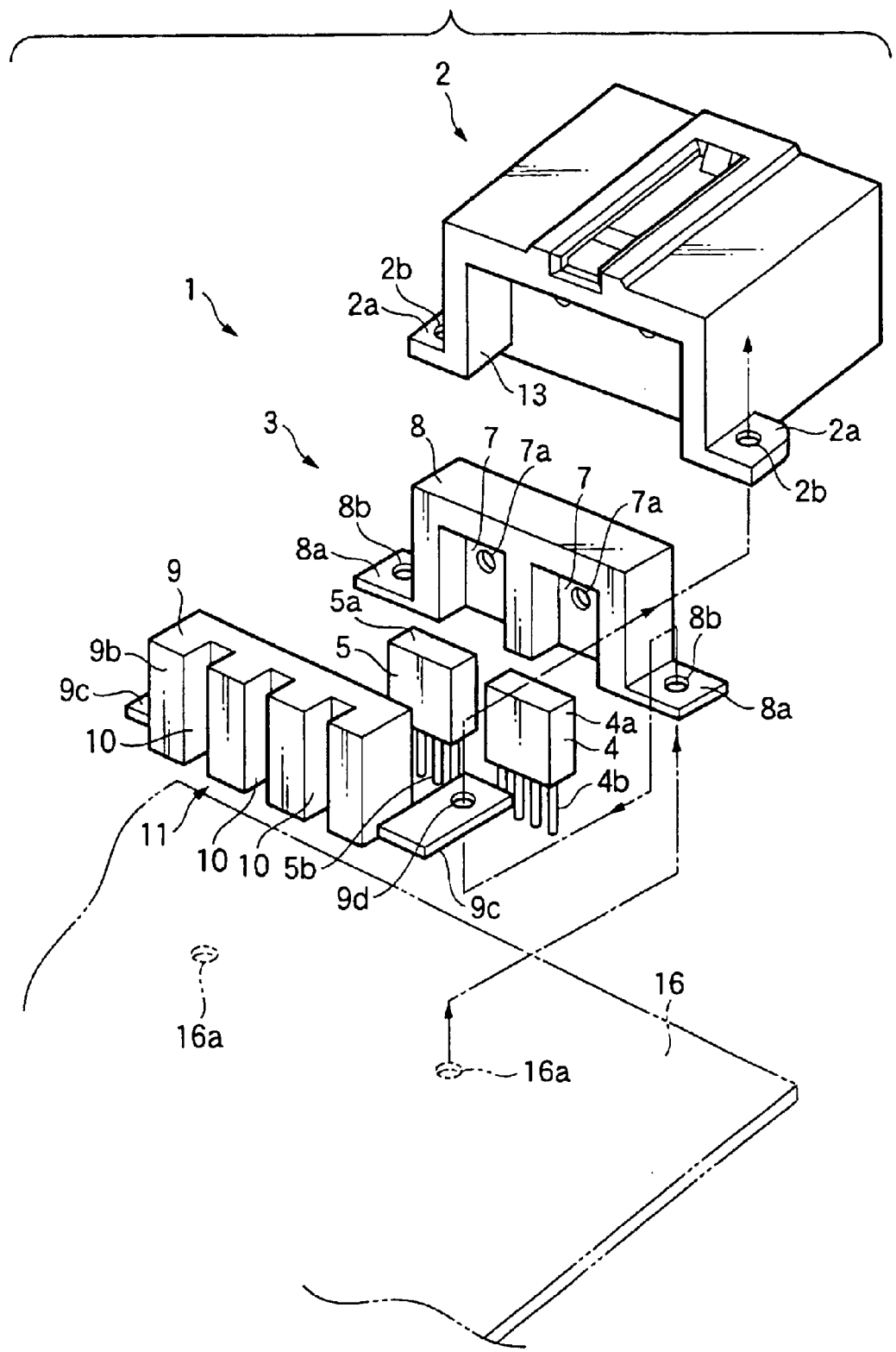
FIG. 1 is an exploded perspective view of an optical connector according to an embodiment of the invention.
Figure 2:
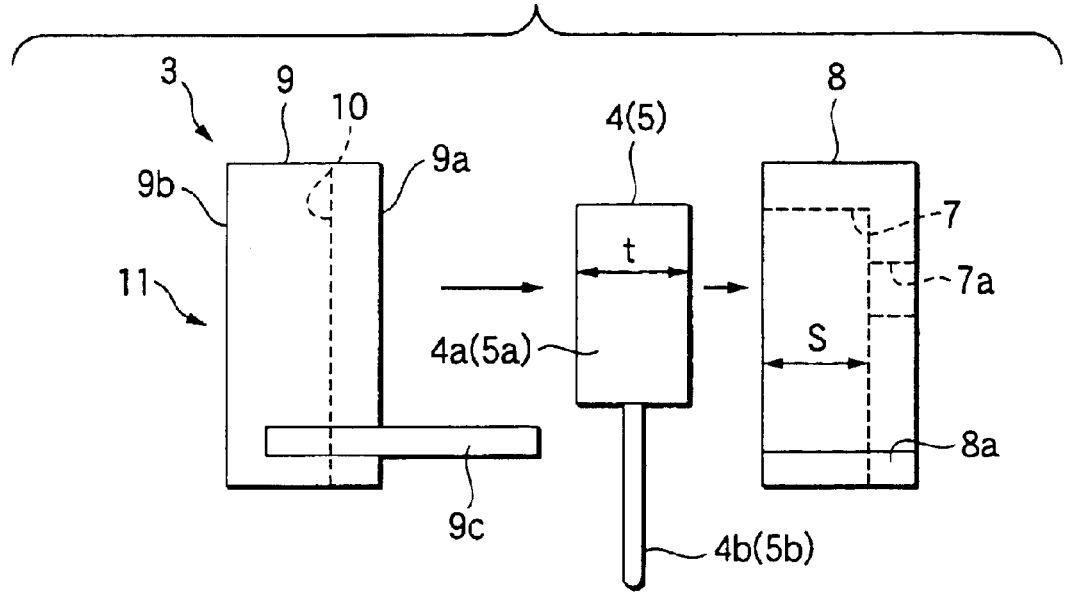
FIG. 2 is a descriptive view showing assembly of a shielding case.
Figure 3:
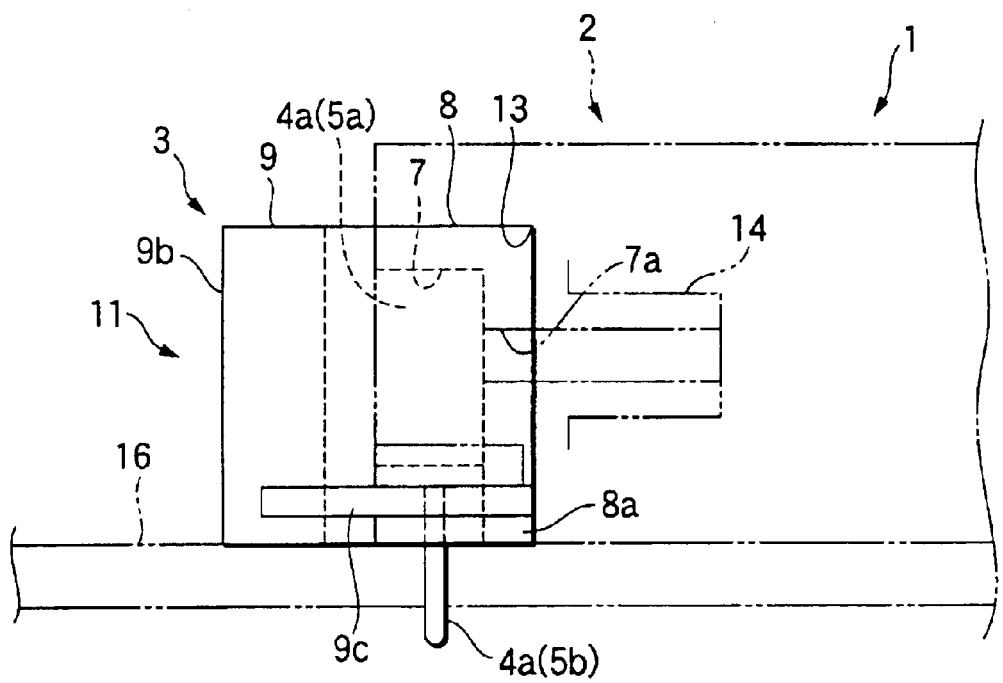
FIG. 3 is a side view showing an assembled state of the shielding case.

An embodiment of the invention will be described hereinbelow by reference to the accompanying drawings. As shown in FIGS. 1 through 3, an optical connector 1 is primarily constituted of, e.g., resin having an insulation characteristic; a shielding case 3 made of metal material having conductivity, such as aluminum or an aluminum alloy; and a light-emitting element 4 and a light-receiving element 5, which act as optical elements and are paired with each other.

The shielding case 3 is formed in the shape of a substantially-rectangular parallelepiped. The shielding case 3 has a two-way split structure consisting of a case main body section 8 and a heatsink mechanism section 9. Housing recesses 7—into which are formed a rectangularly-parallelepiped element main body section 4a of the light-emitting element 4 and a rectangularly-parallelepiped element main body section 5a of the light-emitting element 5—are formed side by side in the case main body section 8 with reference to a widthwise direction thereof while being partitioned independently from each other. The heatsink mechanism section 9 acts as a closure section to be attached to the case main body section 8 from its back in order to close rear opening sections of the respective housing recesses 7 in the case main body section 8.

While the element main body section 4a of the optical element 4 and the element main body section 5a of the optical element 5 are fitted into the respective housing recesses 7 of the case main body section 8, lead terminals 4b of the optical element 4 and lead terminals 5b of the optical element 5 project downward from the respective housing recesses 7. While the element main body sections 4a and 5a are fitted into the respective housing recesses 7. Window sections 7a are formed in the case main body section 8 so as to correspond to a light-emitting plane provided on the front side of the element main body section 4a and a light-receiving plane provided in the front side of the element main body section 5a.

A flat mount piece section 8a is projectingly formed in a lower end section on either side surface of the case main body section 8. A screw insertion hole 8b is formed in each mount piece section 8a.

A front surface of the heatsink mechanism section 9; namely, a joint plane 9a to be connected to the rear surface of the case main body section 8, is formed into the shape of a flat plane. Trench sections 10 are formed in a rear surface of the heatsink mechanism section 9; that is, a non-joint plane 9b opposite to the joint plane 9a, so as to become spaced apart from each other at appropriate intervals in a widthwise direction and extend vertically, thus constituting a corrugated heatsink fin 11.

A plate-like mount piece section 9c is projectingly formed at a lower position on either side surface of the heatsink mechanism section 9. When the heatsink mechanism section 9 is attached to the case main body section 8, the mount piece sections 9c are superimposed on respective upper surfaces of the mount piece sections 8a. A screw insertion hole 9d to be brought into communication with the corresponding screw insertion hole 8b is formed in each of the mount piece sections 9c.

The depth S of each housing recess 7 is set so as to become slightly smaller than the cross directional thickness "t" of each of the element main body sections 4a, 5a such that the element main body sections 4a, 5a are retained in the corresponding housing recesses 7 in a sandwiched manner while the joint plane 9a of the heatsink mechanism section 9 is fitted into the back of the case main body section 8.

A case housing recess 13 opens rearward in the back of the connector housing 2. The case main body section 8 of the shielding case 3 is fitted into the case housing recess 13. Further, mount piece sections 2a are projectingly formed at lower positions on respective rear side surfaces of the connector housing 2, wherein the mount piece sections 2a are to be superimposed on respective upper surfaces of the mount pieces 9a of the heatsink mechanism section 9. Female thread holes 2b are formed in the respective mount piece sections 2a so as to be brought into communication with the respective screw insertion holes 8b and the screw insertion holes 9d.

Cylindrical ferrule guide sections 14 are formed in the connector housing 2 so as to be brought into communication with the respective window sections 7a while the case main body section 8 of the shield case 2 is fitted into the case housing recess 13.

The embodiment has been constructed in the foregoing manner. When the optical connector 1 is mounted on the circuit board 16, the element main body sections 4a, 5a of the optical elements 4, 5 are fittingly housed in the respective housing recesses 7 of the case main body section 8. Further, while the joint plane 9a of the heatsink mechanism section 9 is joined to the back of the case main body section 8 and while the case main body section 8 is fitted into the case housing recess 13 of the connector housing 2, the lead terminals 4b, 5b are inserted into insertion holes formed in a predetermined circuit pattern of the circuit board 16. Further, a lower surface of the shield case 3 is placed at a predetermined location while remaining in plane contact with a ground circuit of the circuit board 16.

In this state, fastening screws are sequentially inserted, from below the lower surface of the circuit board 16, into screw insertion holes 16a formed in the circuit board 16, the screw insertion holes 8b formed in the mount piece sections 8a, and the screw insertion holes 9d of the mount piece sections 9c, and screw-engaged with the female thread holes 2b of the mount piece sections 2a. As a result, the connector housing 2, the shielding case 3, and the optical elements 4, 5 are mounted integrally on the circuit board 16.

At this time, the depth "S" of each housing recess 7 is slightly smaller than the cross directional thickness "t" of each of the element main body sections 4a, 5a of the optical elements 4, 5. Hence, while the fixedly-mounted case main body section 8 is connected to the heatsink mechanism section 9, the optical elements 4, 5 are sandwiched and held between the case main body section 8 and the heatsink mechanism section 9.

As mentioned above, according to the embodiment, the element main body sections 4a, 5a of the optical elements 4, 5 are fittingly housed and held in a sandwiched manner in the respective housing recesses 7 formed in the shielding case 3 made of metal material; that is, a combination of the case main body section 8 and the heatsink mechanism section 9. Hence, the element main body sections 4a, 5a, the case main body section 8, and the heatsink mechanism section 9 can be retained tightly without involvement of clearance, thereby enabling efficient heat transfer and heatsinking. Further, the case main body section 8 and the heatsink mechanism section 9 are held in plane contact with the ground circuit, thus realizing a superior shielding effect. Moreover, there is an advantage of superior countermeasures against noise and heat are yielded.

Since the influence of heat and noise can be lessened, the optical connector 1 can use a light-emitting element 4 and light-receiving element 5.

Further, the heatsink fin section 11 of the shield case 3 is housed and retained in the connector housing 2 in an outwardly-exposed manner. The heatsink fin section 11 enables more efficient radiation. Even in this regard, the optical connector is superior in measures against heat.

Further, since the housing recesses 7 are formed independently, the respective housing recesses 7 can hold the element main body sections 4a, 5a in stable positions and shield the same independently. Further, there can be ensured a wider contact area between the exterior surfaces of the element main body sections 4a, 5a and the interior surfaces of the respective housing recesses 7. Even in this regard, there is yielded an advantage of the ability to achieve superior countermeasures against noise and heat.

Further, fastening screws are sequentially inserted into the screw insertion holes 16a formed in the circuit board 16, the screw insertion holes 7b of the mount piece sections 8a, and the screw insertion holes 9d formed in the mount piece sections 9c and screw-engaged with the female thread holes 2b of the mount piece sections 2a. As a result, the connector housing 2, the shielding case 3, and the optical elements 4, 5 can be fixedly mounted in one piece on the circuit board 16. Hence, the connector housing 2 is superior even in ease of assembly.

In this embodiment, the case main body section 8 and the heatsink mechanism 9 are respectively made of metal material. Alternatively, the case main body section 8 and the heatsink mechanism section 9 may be made of conductive resin. In this case, the optical elements 4, 5 can be retained in the respective housing recesses 7 in a sandwiched manner by means of elastic action of plastic and superior holding force. Further alternatively, either the case main body section 8 or the heatsink mechanism section 9 may be formed from conductive resin.

The embodiment shows that the optical elements 4, 5 are of two-polarity type. The optical elements may be constructed in the same manner even when the optical elements are of single-polarity type or have three or more polarities.

The connector housing 2, the case main body section 8, and the heatsink mechanism section 9 are fastened to the circuit board 16 with fastening screws. As a result, they are mounted and fixed on the circuit board 16 in one piece. Alternatively, the case main body section 8 and the heatsink mechanism section 9 may be fastened together beforehand, after which the thus-fixed shielding case 3 is housed in the case housing recess 13 of the connector housing 2. The connector housing 2 may be mounted on the circuit board 16.

Further, the case main body section 8 is shown as having the housing recesses 7. Alternatively, the heatsink mechanism section 9 may have the housing recesses 7. Further alternatively, recesses may be formed in the heatsink mechanism section 9 as well as in the case main body section 8 such that the housing recesses 7 are formed when they are joined together.

As has been described, according to an optical connector of the invention, a shielding case is formed in a split manner from a case main body section and a closure section, which constitute a housing recess when joined together. When the case main body section and the closure section are joined together, an element main body section of an optical element is situated in the housing recess and retained and sandwiched between the case main body section and the closure section. Thus, the optical element can be held tightly without involvement of clearance. There is yielded an advantage of efficient heat transfer, efficient heatsinking, and superior countermeasures against noise and heat.

A non-joint plane opposite to a joint plane of the closure section to be connected to the case main body section is to be housed in the connector housing in an outwardly exposed state. A corrugated heatsinking fin section is provided in the non-joint plane. Even in this regard, there is yielded an advantage of superior countermeasures against heat.

The optical element is embodied as a plurality of optical elements, and housing recesses into which the optical elements are to be housed are formed in the case main body section independently and side by side while being partitioned from each other. Such a structure yields an advantage of the ability to realize independent shielding and much superior countermeasures against noise and heat.

When the case main body section and the closure section are formed from metal material, there is yielded an advantage of superior heatsinking. In contrast, when they are made of conductive resin, there is yielded an advantage of the ability to generate superior clamping force.

The Second Preferred Embodiment-

Figure 4:
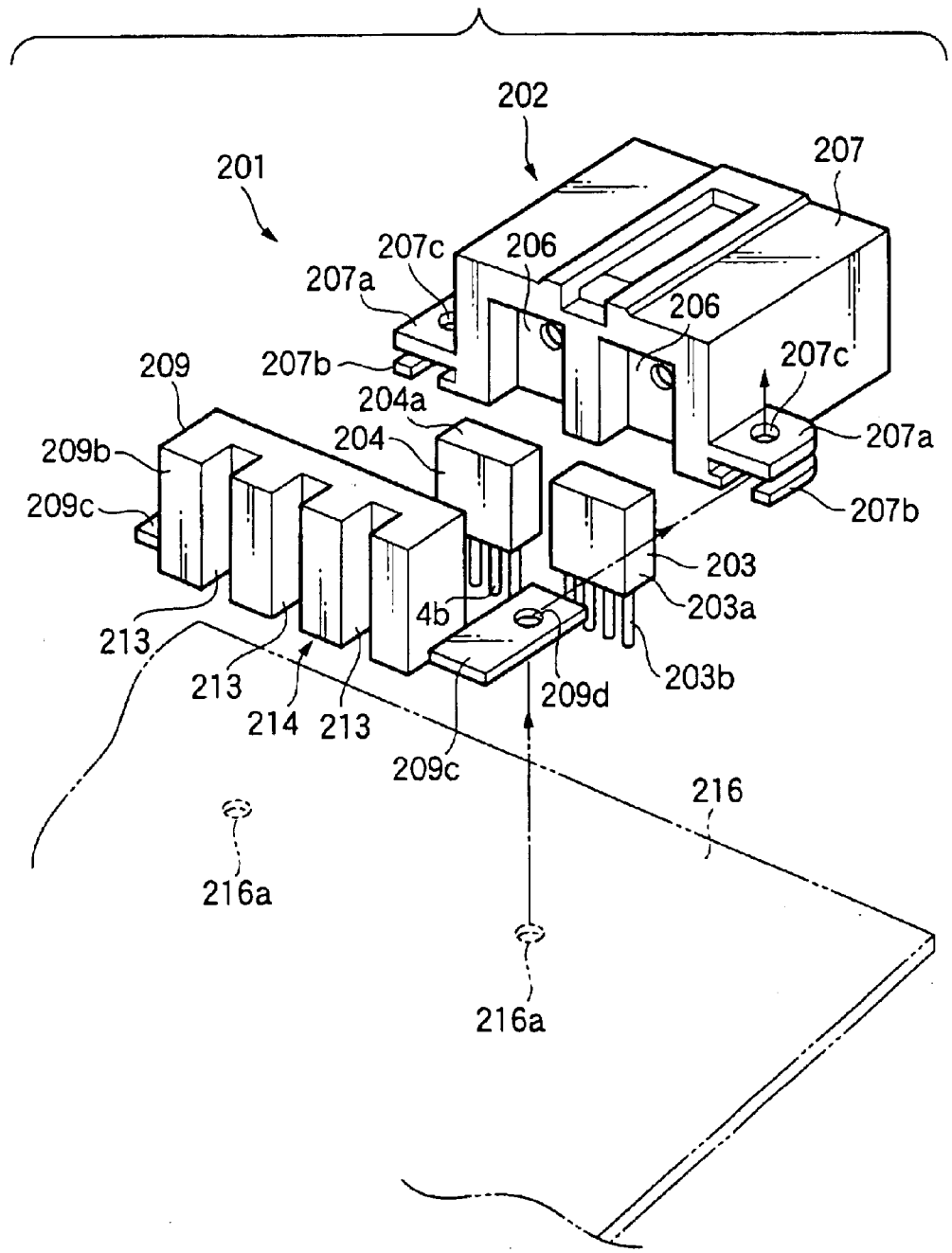
FIG. 4 is an exploded perspective view of an optical connector according to an embodiment of the invention.
Figure 5:
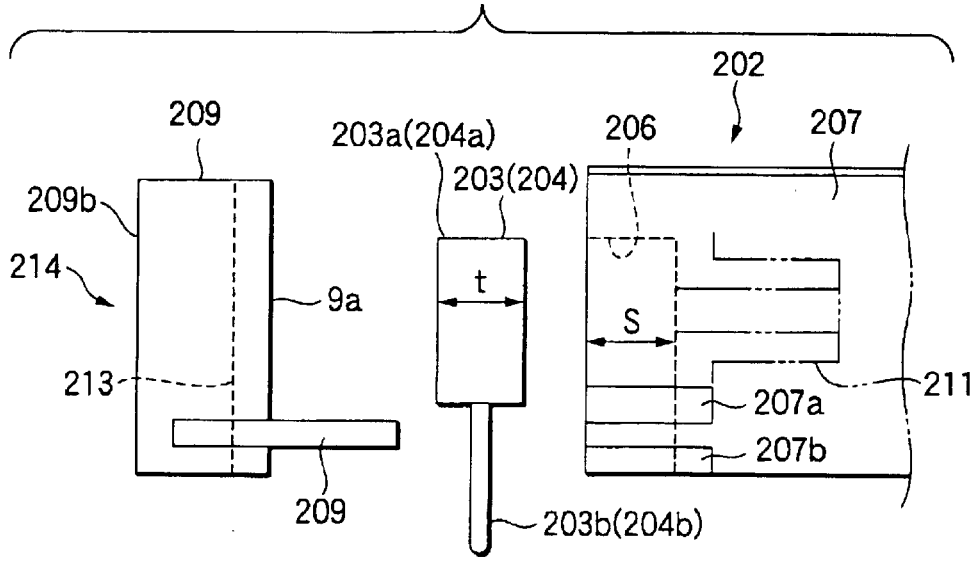
FIG. 5 is a descriptive view showing assembly of a connector housing.
Figure 6:
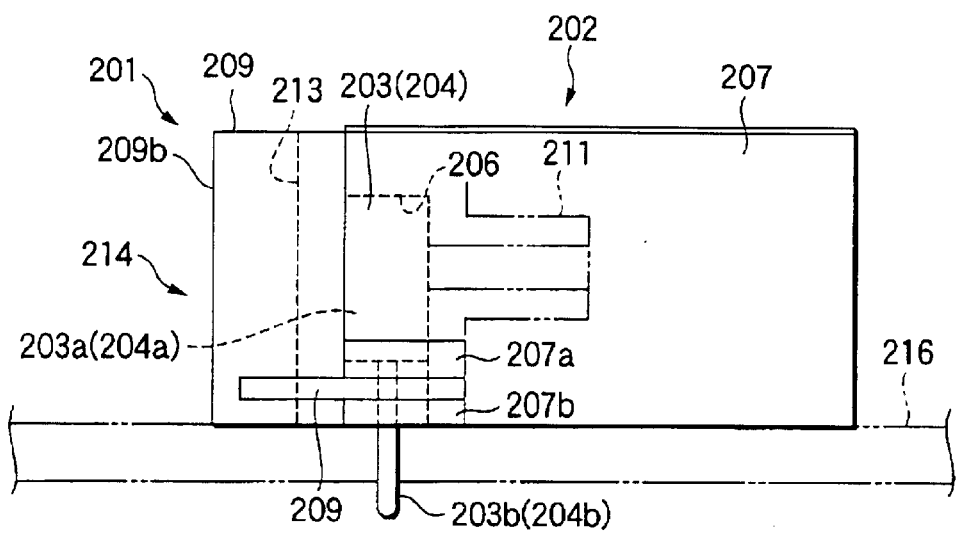
FIG. 6 is a side view showing an assembled state of the connector housing.
Figure 7:
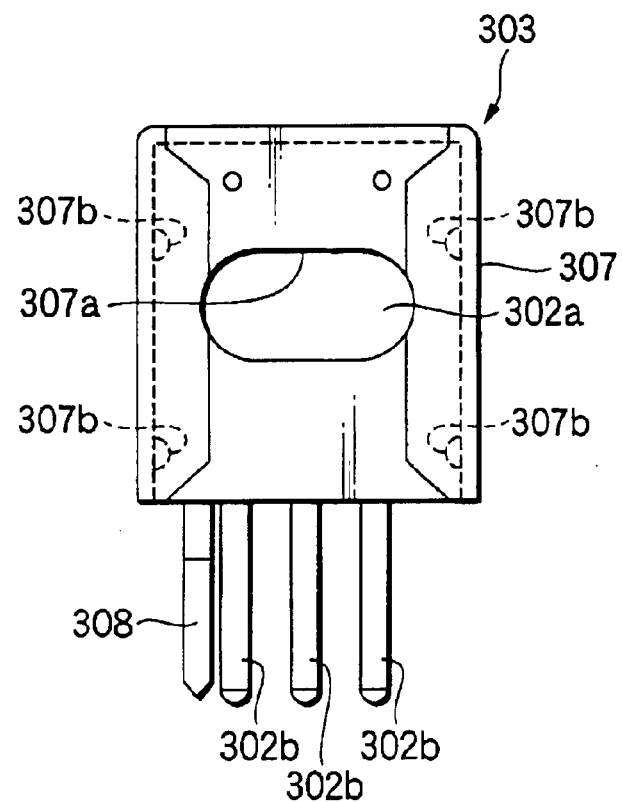
FIG. 7 is a front view showing a shielding case holding an optical element according to a first embodiment of the invention.
Figure 8:
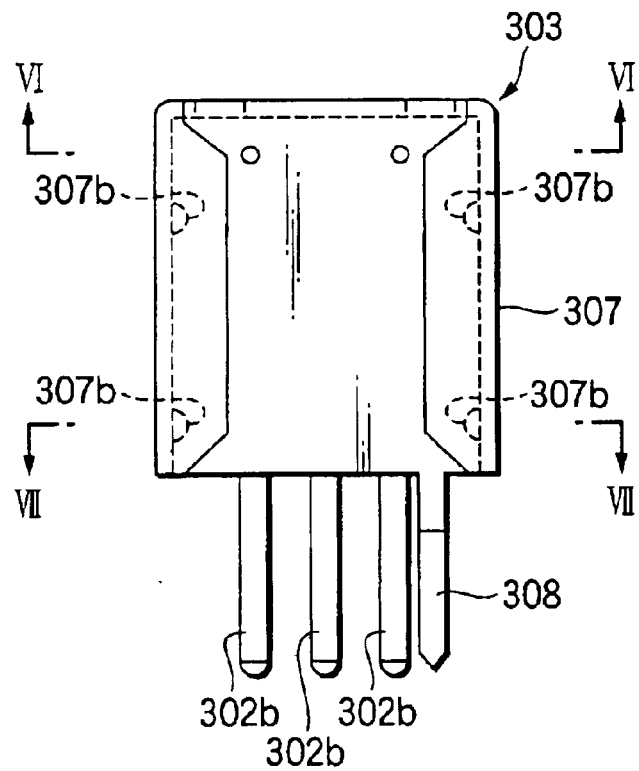
FIG. 8 is a rear view of the shielding case.
Figure 9:
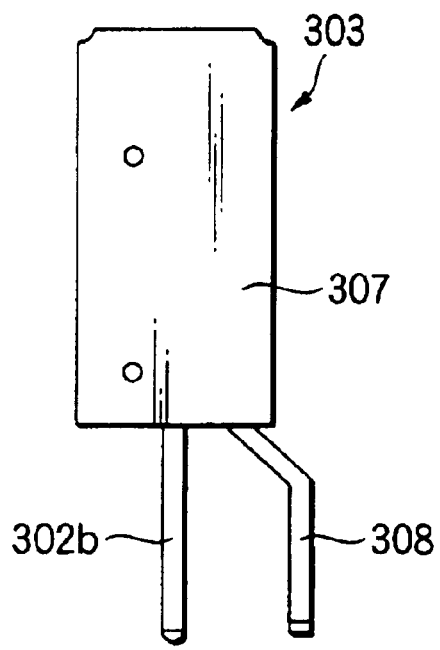
FIG. 9 is a right side view of the shielding case shown in FIG. 7.
Figure 10:
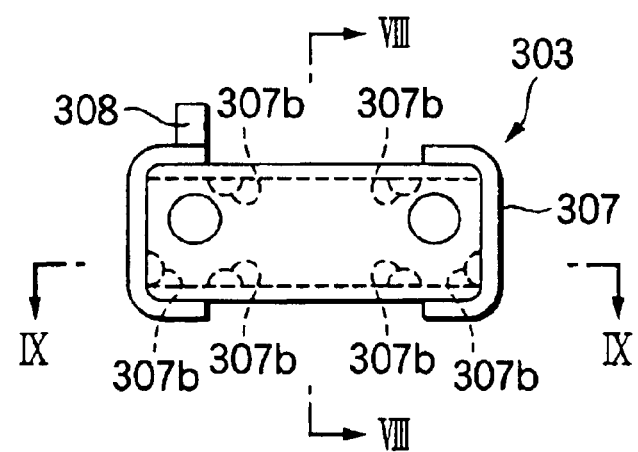
FIG. 10 is a plan view of the shielding case shown in FIG. 7.
Figure 11:
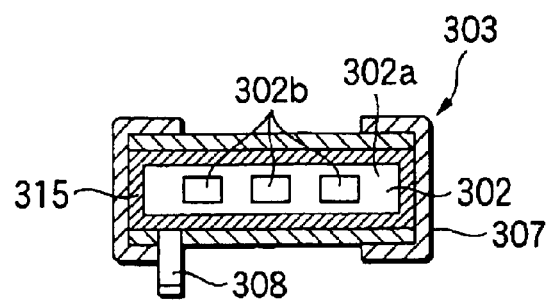
FIG. 11 is a bottom view of the shielding case shown in FIG. 7.
Figure 12:
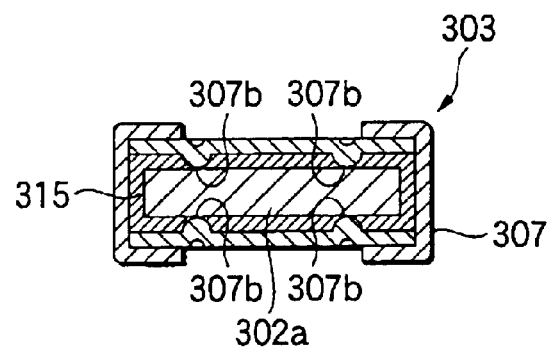
FIG. 12 is a cross-sectional view taken along line 12—12 shown in FIG. 8.
Figure 13:
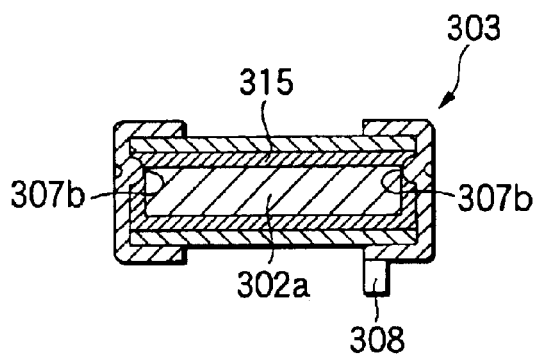
FIG. 13 is a cross-sectional view taken along line 13—13 shown in FIG. 8.
Figure 14:
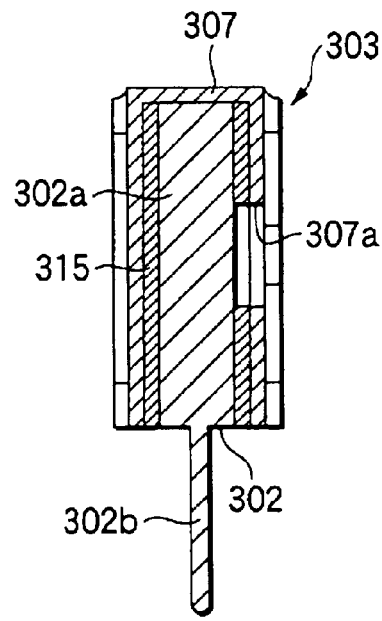
FIG. 14 is a cross-sectional view taken along line 14—14 shown in FIG. 10.
Figure 15:
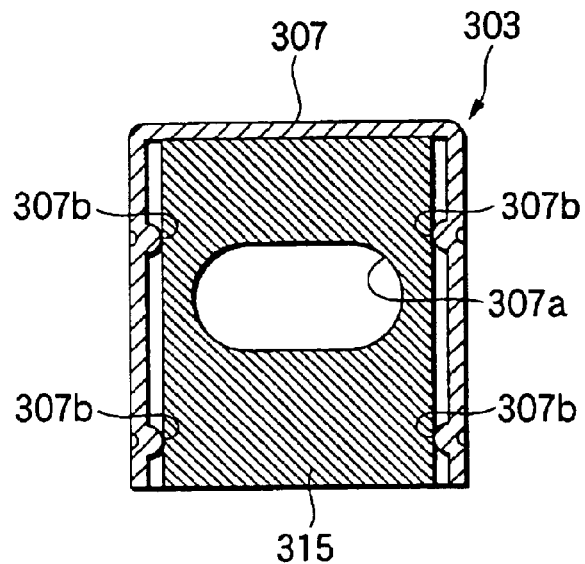
FIG. 15 is a cross-sectional view taken along line 15—15 shown in FIG. 10.

An embodiment of the invention will be described hereinbelow by reference to the accompanying drawings. As shown in FIGS. 4 through 6, an optical connector 201 is primarily constituted of a connector housing 202 which is formed from conductive material, e.g., metal material such as aluminum or an aluminum alloy; and a light-emitting element 203 and a light-receiving element 204, which act as optical elements and are paired with each other.

The connector housing 202 is formed in the shape of a substantially-rectangular parallelepiped. The connector housing 202 has a two-way split structure consisting of a housing main body section 207 and a heatsink mechanism section 209. Housing recesses 206—into which are formed a rectangularly-parallelepiped element main body section 203a of the light-emitting element 203 and a rectangularly-parallelepiped element main body section 204a of the light-emitting element 204—are formed side-by-side in the housing main body section 207 with reference to a widthwise direction thereof while being partitioned separately from each other. The heatsink mechanism section 209 acts as a closure section to be attached to the housing main body section 207 from its back in order to close rear opening sections of the respective housing recesses 206 in the housing main body section 207.

While the element main body section 203a of the optical element 203 and the element main body section 204a of the optical element 204 are fitted into the respective housing recesses 206 of the housing main body section 207, lead terminals 203b of the optical element 203 and lead terminals 204b of the optical element 204 project downward from the respective housing recesses 206. While the element main body sections 203a, 204a are fitted into the respective housing recesses 206, cylindrical ferrules 211 are formed in the housing main body 207 so as to correspond to a light-emitting plane provided on the front side of the element main body section 203a and a light-receiving plane provided on the front side of the element main body section 204a.

Two-stage mount piece sections 207a, 207b, each having a predetermined vertical interval, are projectingly formed in lower portions on respective side surfaces in the rear end portion of the housing main body section 207. Upper mount piece sections 207a are formed into the shape of plates, and female thread holes 207c are formed in the respective upper mount piece sections 207a. The lower mount piece sections 207b are formed so as to assume a substantially U-shaped cross-sectional profile when viewed from the bottom. Fastening screws to be screwed into the female thread holes 207c can be inserted by way of U-shaped spaces.

A front surface of the heatsink mechanism section 9; namely, a joint plane 209a to be connected to the rear surface of the housing main body section 207, is formed into the shape of a flat plane. Trenches 213 are formed in a rear surface of the heatsink mechanism section 9; that is, a non-joint plane 209b opposite the joint plane 209a, so as to become spaced apart from each other at appropriate intervals in a widthwise direction and extend vertically, thus constituting a corrugated heatsink fin 214.

A plate-like mount piece section 209c is projectingly formed at a lower position on either side surface of the heatsink mechanism section 209. When the heatsink mechanism section 209 is attached to the housing main body section 207, the mount piece sections 209c are fitted into corresponding spaces, each being defined between the upper and lower mount piece sections 207a, 207b, in a stacked manner. A screw insertion hole 209d to be brought into communication with the female thread hole 207c is formed in each of the mount piece sections 209c.

The depth S of each housing recess 206 is set so as to become slightly smaller than the cross directional thickness "t" of each of the element main body sections 203a, 204a such that the element main body sections 203a, 204a are retained in the corresponding housing recesses 206 in a sandwiched manner while the joint plane 209a of the heatsink mechanism section 209 is fitted into the back of the housing main body section 207.

The embodiment has been constructed in the foregoing manner. When the optical connector 201 is mounted on a circuit board 216, the element main body sections 203a, 204a of the optical elements 203, 204 are fittingly housed in the respective housing recesses 206 of the housing main body section 207. Further, while the joint plane 209a of the heatsink mechanism section 209 is joined to the back of the housing main body section 207, the lead terminals 203b, 204b are inserted into insertion holes formed in a predetermined circuit pattern of the circuit board 216. A lower surface of the housing main body section 207 and/or a lower surface of the heatsink mechanism section 209 are/is placed at a predetermined location(s) while remaining in plane contact with a ground circuit of the circuit board 216.

In this state, fastening screws are sequentially inserted, from below the lower surface of the circuit board 216, into screw insertion holes 216a formed in the circuit board 216, the spaces of the mount piece sections 207b, and the screw insertion holes 209d formed in the mount piece sections 209c and screw-engaged with the female thread holes 207c of the mount piece sections 207a. As a result, the housing main body section 207 and the heatsink mechanism section 209 are fixedly mounted in one piece on the circuit board 216.

At this time, the depth "S" of each housing recess 206 is slightly smaller than the cross directional thickness "t" of each of the element main body sections 203a, 204a of the optical elements 203, 204. Hence, while the fixedly-mounted housing main body section 207 is connected to the heatsink mechanism section 209, the optical elements 203, 204 are sandwiched between the housing main body section 207 and the heatsink mechanism section 209.

As mentioned above, according to the embodiment, the element main body sections 203a, 204a of the optical elements 203, 204 are fittingly housed and held in a sandwiched manner in the respective housing recesses 206 formed in the connector housing 202 made of metal material; that is, a combination of the housing main body section 207 and the heatsink mechanism section 209. Hence, the element main body sections 203a, 204a, the housing main body section 207, and the heatsink mechanism section 209 can be retained tightly without involvement of clearance, thereby enabling efficient heat transfer and heatsinking. The connector housing 202 according to the embodiment does not involve retention of heat and enables heatsinking of the overall connector housing 202. Even in this regard, the connector housing 202 is superior to a related-art connector housing in which optical elements are housed in a metal case and the metal case is housed further in a plastic housing.

The connector housing 202 has a structure in which the housing main body section 207 and/or the heatsink mechanism 209 are held in plane contact with a ground circuit. Hence, the connector housing 202 yields an advantage of the ability to achieve a superior shielding effect, superior countermeasures against noise and heat, and obviation of a metal case, which is required in the related art.

Since the influence of heating and noise can be lessened, the optical connector 201 can use the light-emitting element 203 and the light-receiving element 204, which operate at faster speed.

Further, the heatsink fin 214 of the shield case 203 enables more efficient heatsinking. Even in this regard, the connector housing 202 is superior in countermeasures against heat.

The geometry of the heatsink fin 214 is changed appropriately in accordance with the amount of heat generated by the optical elements 203, 204 used in the connector housing 202. Thus, there is also yielded an advantage of the ability to effect adjustment so as to achieve a desired amount of heat to be dissipated.

Further, since the housing recesses 206 are formed independently, the respective housing recesses 206 can hold the element main body sections 203a, 204a in stable positions and shield the same independently. Further, there can be ensured a wider contact area between the exterior surfaces of the element main body sections 203a, 204a and the interior surfaces of the respective housing recesses 206. Even in this regard, there is yielded an advantage of the ability to achieve superior countermeasures against noise and heat.

Further, fastening screws are sequentially inserted, from below the lower surface of the circuit board 216, into the screw insertion holes 216a formed in the circuit board 216, the spaces of the mount piece sections 207b, and the screw insertion holes 209d formed in the mount piece sections 209c and screw-engaged with the female thread holes 207c of the mount piece sections 207a. As a result, the connector housing 202 and the optical elements 203, 204 are fixedly mounted in one piece on the circuit board 216. Hence, the connector housing 202 is superior even in ease of assembly.

In the embodiment, the housing main body section 207 and the heatsink mechanism 209 are made of metal material. Alternatively, the housing main body section 207 and the heatsink mechanism section 209 may be made of conductive resin. In this case, the optical elements 203, 204 can be retained in the respective housing recesses 206 in a sandwiched manner by means of elastic action of plastic and superior holding force. Further alternatively, either the housing main body section 207 or the heatsink mechanism section 209 may be formed from conductive resin. In this case, even in terms of a heatsinking characteristic, the heatsink mechanism section 209 having the heatsink fin 214 is preferably formed from metal material. Furthermore, the housing main body section 207 may be imparted with conductivity, by means of plating the surface of the housing main body section 207 with metal.

The embodiment shows that the optical elements 203, 204 are of a two-polarity type. The optical elements may be constructed in the same manner even when the optical elements are of a single-polarity type or have three or more polarities.

The housing main body section 207 and the heatsink mechanism section 209 are fastened to the circuit board 216 with fastening screws. As a result, they are mounted and fixed on the circuit board 216 in one piece. Alternatively, the housing main body section 207 and the heatsink mechanism section 209 may be fastened together beforehand, and the thus-fixed connector housing 202 may be mounted and fixed on the circuit board 216.

Further, the housing main body section 207 is shown as having the housing recesses 206. Alternatively, the heatsink mechanism section 209 may have the housing recesses 206. Further alternatively, recesses may be formed in the heatsink mechanism section 209 as well as in the housing main body section 207 such that the housing recesses 206 are formed when they are joined together.

As has been described, according to an optical connector of the invention, a connector housing is formed from conductive material. Further, the connector housing is formed in a split manner from a housing main body section and a closure section, which constitute housing recesses when joined together. When the housing main body section and the closure section are joined together, element main body sections are situated in the housing recesses and retained and sandwiched between the housing main body section and the closure section. Thus, the optical elements can be held tightly without involvement of clearance, thus yielding an advantage of efficient heat transfer, efficient heatsinking, and superior countermeasures against noise and heat.

A corrugated heatsinking fin section is provided in a non-joint plane of the closure section opposite a joint plane thereof to be connected to the housing main body section. Even in this regard, there is yielded an advantage of superior countermeasures against heat.

If the closure section is formed from metal material, there is yielded an advantage of superior heat conductivity and heatsinking characteristic.

The Third Preferred Embodiment-

Figure 16:
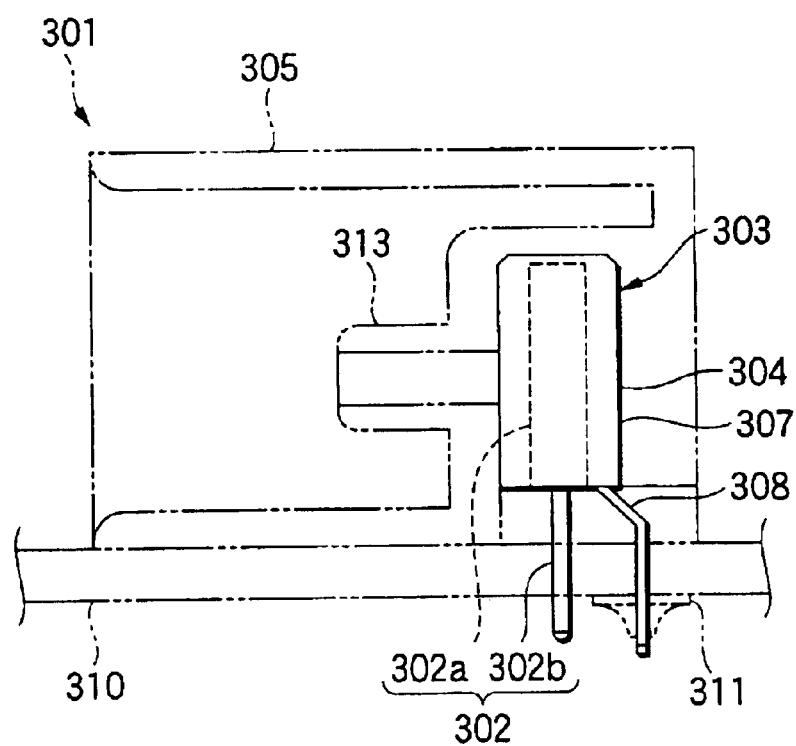
FIG. 16 is a descriptive view showing a mounted state of an optical connector.
Figure 17:
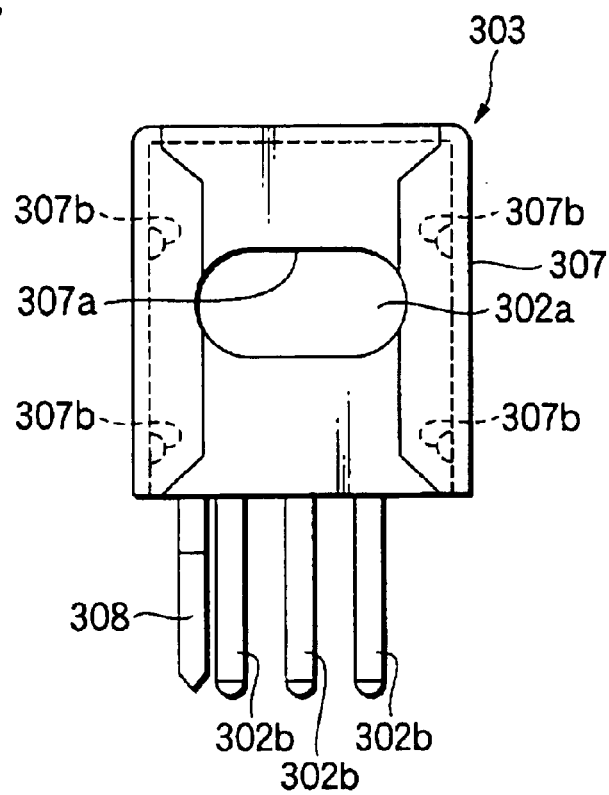
FIG. 17 is a front view of a shielding case holding an optical element according to a second embodiment of the invention.
Figure 18:
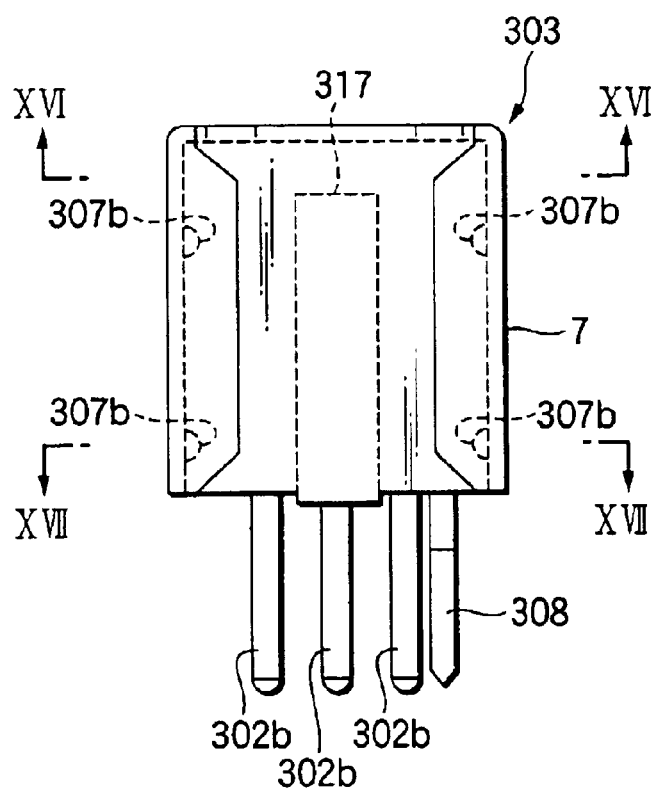
FIG. 18 is a rear view of the shielding case shown in FIG. 17.
Figure 19:
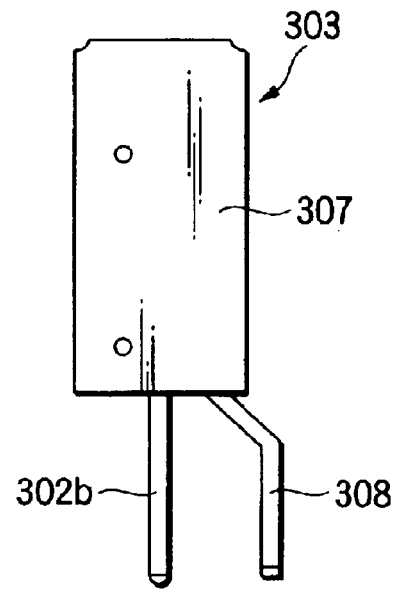
FIG. 19 is a right side view of the shielding case shown in FIG. 17.
Figure 20:
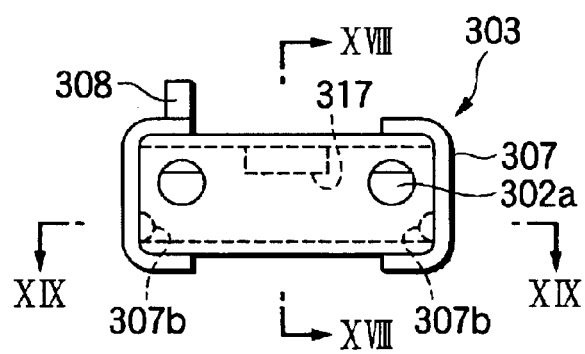
FIG. 20 is a plan view of the shielding case shown in FIG. 17.
Figure 21:
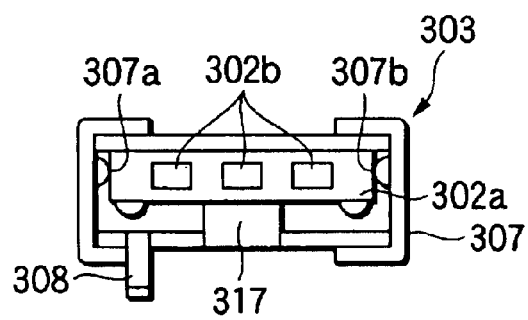
FIG. 21 is a bottom view of the shielding case shown in FIG. 17.
Figure 22:
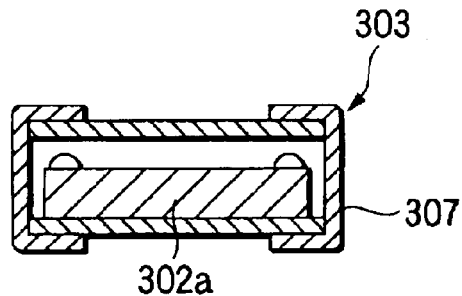
FIG. 22 is a cross-sectional view taken along line 22—22 shown in FIG. 18.
Figure 23:
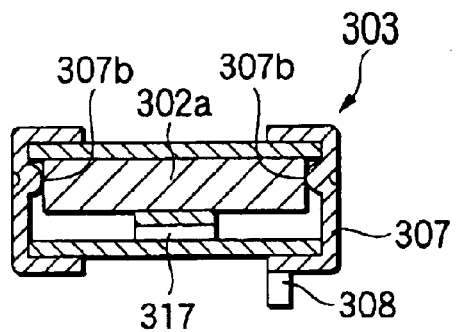
FIG. 23 is a cross-sectional view taken along line 23—23 shown in FIG. 18.
Figure 24:
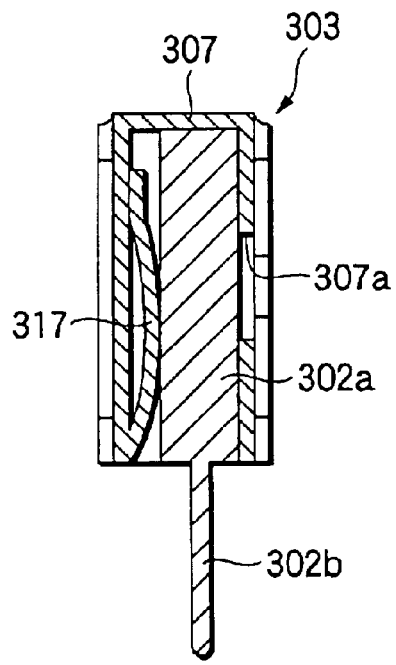
FIG. 24 is a cross-sectional view taken along line 24—24 shown in FIG. 20.
Figure 25:
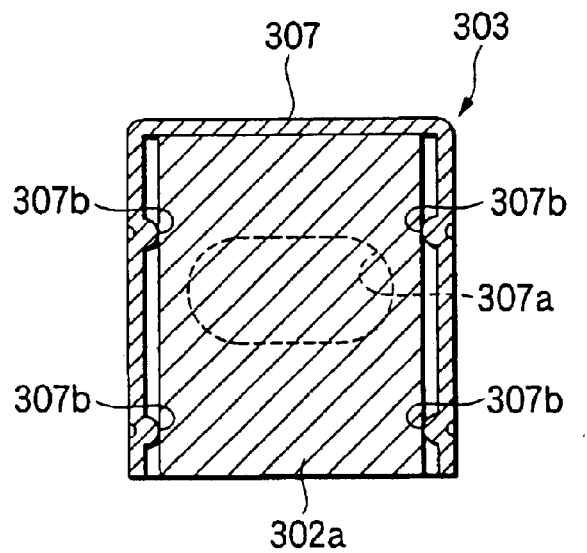
FIG. 25 is a cross-sectional view taken along line 25—25 shown in FIG. 20.

A first modification of this embodiment will be described hereinbelow by reference to the drawings. As shown in FIG. 16, an optical connector 301 is constituted primarily of a shielding case 303 capable of housing an element main body section 302a of an optical element 302 made of a light-emitting element or a light-receiving element; and a connector housing 305 which is formed from insulating resin and has a case housing recess section 304 for housing and holding the shielding case 303.

The number of optical elements 302 to be housed in the optical connector 301 is not limited to one, and may be two or more, as required.

As shown in FIGS. 7 through 15, the shielding case 303 is formed by means of punching and folding a conductive material; e.g., a plate material made of metal material such as brass, phosphor bronze, stainless steel, or German silver (nickel silver). The shielding case 303 has a case main body section 307 capable of housing an element main body section 302a of the optical element 2; and lead sections 308 extending downward from the case main body section 307.

The case main body section 307 is formed into a substantially box-shaped form, and an opening is formed in a bottom of the case main body section 307. When the element main body section 302a of the optical element is fitted into the case main body section 307 from the opening, the entirety of the element main body section 302a is housed and arranged in the case main body section 307. In this state, the entirety of the element main body section 302a is covered with the case main body section 307. By means of grounding the lead sections 308, as required, the optical element 302 is electromagnetically shielded. For example, the lead sections 308 are grounded by means of soldering the lead sections 308 to a ground circuit 311 formed on a circuit board 310.

A horizontally-elongated window section 307a for optical communication purpose is formed in a front surface side of the case main body section 307. A light-receiving or light-emitting plane provided in a front surface side of the element main body section 302a faces the outside by way of the window section 307a. When the shielding case 303 is fittingly housed in the case housing recess 304 of the connector housing 305, a cylindrical ferrule 313 is formed at a position on the connector housing 305 corresponding to the position of the window 307a of the case main body section 307.

The leads 308 are formed so as to extend downward from the peripheral edge of the opening formed in the bottom of the case main body section 307.

Positioning bumps 307b are formed on a front wall section, a rear wall section, and side wall sections of the case main body section 307 so as to bulge toward the inside of the case main body section 307. When the element main body section 302a of the optical element 302 is fitted into the case main body section 307, the element main body section 302a can be retained at a predetermined position within the case main body section 307.

While the element main body section 302a is housed in the case main body section 307, lead terminals 302b extending downward from the element main body section 302a extend downward from the opening formed in the bottom of the case main body section 307. The respective lead terminals 302b can be soldered to a predetermined trace formed on the circuit board 310.

While the element main body section 302a is positioned in the case main body section 307, a clearance existing between an internal circumferential surface of the case main body section 307 and an outer circumferential surface of the element main body section 302a, except for the position of the window 307a, is filled with thermal conductive material 315 which is a gel or a liquid, has a superior heat transfer characteristic, and sets under certain temperature conditions. Accordingly, the element main body section 302a is fixedly held in the case main body section 307 without involvement of a clearance.

As the thermal conductive material 315 to be used for filling, there is employed, e.g., a material made by means of mixing a metal filler or aluminum powder into silicon, or a material made by means of mixing, into silicon, a conductive powder, such as carbon powder or a metal filler, and magnetic powder, such as ferrite or Sendust.

Preferably, during the step filling the clearance with the thermal conductive material 315, the position of the window section 307a and the position of a light-receiving or light-emitting plane of the element main body section 302a are temporarily covered with an elastic material so as to prevent attachment of the thermal conductive material 315 to these positions. Alternatively, walls may be set around the positions, thereby preventing entry of the thermal conductive material 315 into the light-receiving or light-emitting plane.

Since the present modification is embodied in the manner described previously, when the optical connector 301 is fixedly mounted on the circuit board 310, the element main body section 302a of the optical element 302 is fittingly housed in the case main body section 307 of the shielding case 303 beforehand, and the clearance is filled with the thermal conductive material 315. In a state in which the thus-filled thermal conductive material has set and fixedly holds the element main body section 302a, the case main body section 307 is fitted into the case housing recess 304 of the connector housing 305. The respective lead terminals 302b are inserted into insertion holes formed in predetermined circuit traces of the circuit board 310. The lead sections 308 are inserted into the ground circuit 311 and placed at predetermined positions. The optical connector 301 is mounted on and fixed to the circuit board 310 by way of unillustrated screw sections provided on both sides of the connector housing 305. At this time, the lead terminals 302b and the lead sections 308 are connected to predetermined circuits by means of soldering.

Here, the element main body section 302a of the optical element 302 is housed in the shielding case 303 and has superior resistance to noise.

The heat developing in the element main body section 302a of the optical element 302 escapes to the outside by way of the case main body section 7. At this time, the clearance existing between the internal circumferential surface of the case main body section 307 and the outer circumferential surface of the element main body section 302a is filled with the thermal conductive material 315 which is superior in heat conductivity to air. Hence, the heat developing in the element main body section 302a is efficiently transferred to the case main body section 307 by way of the thermal conductive material 315. Thus, the optical connector 301 is superior in heat transfer characteristic.

Since the optical connector 301 is superior in noise resistance and heatsink characteristics, the optical element 302 can be stably activated at a higher speed (i.e., a higher frequency).

So long as a conductive, magnetic, and elastic material (i.e., an elastic material having conductivity and magnetic properties) is used as the thermal conductive material 315, the following effects are yielded.

In the shielding case 303 housing the optical element 302, a light-emitting or light-receiving plane of the optical element 302 faces the outside. Hence, a window section 307a becomes indispensable. However, an eddy current develops in a conductive portion of the edge of the window 307a because of external noise, and the eddy current induces radiation of an electromagnetic wave. Further, the optical element 302 per se produces an electromagnetic wave. Particularly, an electromagnetic wave stemming from activation of the optical element 302 at high frequency is subjected to irregular reflection in an internal space within the case main body section 307.

Conductivity and a magnetic property are imparted to the thermal conductive material 315, thereby absorbing a radiated electromagnetic wave stemming from the eddy current that has developed in the peripheral edge of the window section 307a. Further, the electromagnetic wave generated by the optical element 302 is also absorbed, thereby preventing occurrence of irregular reflection. Particularly, a magnetic property is imparted to the thermal conductive material 315, which thereby exhibits an effective electromagnetic wave absorption effect. There is prevented occurrence of reflection of an electromagnetic wave (i.e., incidence noise), which would otherwise be caused by the surface of the thermal conductive material 315, or occurrence of re-radiation of noise, by means of suppressing a high-frequency current developing in the surface of the shielding case 303.

An elastic material is used for the thermal conductive material 315, thereby preventing occurrence of displacement of the element main body section 302a, by means of absorbing the mechanical/thermal vibration applied to the shielding case 303. As a result, in addition to the effect of absorbing an electromagnetic wave, the thermal conductive material 315 also yields an effect of tightly fixing the element main body section 302a in an accurate position within the case main body section 307. Furthermore, the thermal conductive material 305 absorbs mechanical displacements and thermal natural oscillation stemming from differences in material, dimensions, geometry, and mounting method between the shielding case 307 and the optical element 302, thereby preventing occurrence of breakage in the lead terminals 302b.

FIGS. 17 through 26 show a second modification of the embodiment. Those constituent elements which are the same as those described in connection with the first modification are assigned the same reference numerals, and their explanations are omitted.

In the modification, a spring piece section 317 having an appropriate width is provided integrally in the case main body section 307 in a collapsed form by way of an open edge formed in the lower end of the rear wall section opposite to the window section 307a of the case main body section 307. The spring piece section 317 is provided so as to extend to the vicinity of a top in the case main body section 307.

In the present modification, the positioning bumps 307b are formed only on side wall sections of the case main body section 307.

When the element main body section 302a is inserted into the case main body section 307, the spring piece section 317 is elastically deformed. In a state in which the element main body section 302a is fitted into the case main body section 307, the element main body section 302a is retained while being pressed against the interior surface of the front wall section by means of restoration force of the spring piece section 317.

Since the modification is constructed in the manner as mentioned above, when the optical connector 301 is mounted on the circuit board 310, the case main body section 307 is fitted into the case housing recess section 304 of the connector housing 305 while the element main body section 302a of the optical element 302 is fittingly housed in the case main body section 307 of the shielding case 303. Further, the lead terminals 302b are inserted into the insertion holes of the predetermined circuit trace of the circuit board 310. The lead sections 308 are inserted into the ground circuit 311, thereby placing the optical connector 301 into a predetermined position. The optical connector 301 is fixedly mounted on the circuit board 310 by means of the screw sections provided on both sides of the connector housing 305. At this time, the lead terminals 302b and the lead sections 308 are connected to a predetermined circuit by means of soldering.

As in the case of the first modification, the element main body section 302a of the optical element 302 is housed in the shielding case 303 and has superior noise resistance.

The heat developing in the element main body section 302a of the optical element 302 escapes to the outside by way of the case main body section 307. At this time, the element main body section 302a is pressed against the interior surface of the front wall section within the case main body section 307, by means of the restoration force of the spring piece section 317. The front surface of the element main body section 302a remains in intimate contact with the interior surface of the front wall section of the case main body section 307. The heat developing in the element main body section 302a is efficiently transferred to the case main body section 307 by way of the front wall section or the spring piece section 317 which exerts pressing force. Thus, the element main body section 302a has a superior heatsink characteristic.

The spring piece section 317 is provided on the rear wall section, thereby pressing the element main body section 302a against the interior surface of the front wall section. The light-emitting or light-receiving plane of the element main body section 302a is placed closer to the window section 307a. Thus, a distance between the side of the optical element 302 to be connected to the optical connector 301 and an optical fiber can be shortened further, thereby enabling an attempt to improve stability when optical communication is performed.

As compared with a case where the spring piece section 317 is formed by means of cutting and raising a portion of the rear wall section, an improved electromagnetic shielding function can be exhibited when a portion extending from the lower end of the rear wall section is folded.

The optical connector 301 has a superior heatsink characteristic and noise resistance. Consequently, the optical element 302 can be stably activated at a higher speed (i.e., a higher frequency).

The second modification has shown the structure in which the spring piece section 317 is provided integrally. However, the spring piece section 317 may be formed separately and attached to the interior surface of the case main body section 307. The number of spring piece sections 317 is not limited to one, and the spring piece sections 317 may be provided at multiple locations.

If the spring piece section 317 forcefully presses the neighborhood of a heat source, such as a drive circuit portion of the element main body section 302a, heat is transferred more effectively, thereby greatly enhancing a heatsinking effect.

As in the case of the first modification, the second modification may employ a structure in which a clearance existing between the internal circumferential surface of the case main body section 307 and the outer circumferential surface of the element main body section 302a is filled with the thermal conductive material 315 which assumes the form of a gel or liquid, sets at a certain temperature condition, and has a superior heat transfer characteristic. Even in this case, heat transfer is effected more effectively, thereby further enhancing a heatsinking effect.

Rather than the clearance between the internal circumferential surface of the case main body section 307 and the outer circumferential surface of the element main body section 302a being filled with the thermal conductive material 315, an elastic member having a superior heat transfer characteristic; for example, an elastic member such as one made of rubber—in which a conductive powder such as a carbon powder or a metal filler and a magnetic powder such as ferrite or Sendust are mixed—may be interposed in a compressed state in the clearance. Even in this case, heat transfer is performed more effectively, thereby further enhancing the heatsinking effect. A soft material involving little compression set is preferable as an elastic material.

In the respective modifications, the connector housing 305 is not limited to resin and may be formed from a metal material such as aluminum or an aluminum alloy. When the connector housing 305 per se is formed from metal material, the heat developing in the optical element 302 becomes likely to escape to the outside from the shielding case 303 by way of the entire connector housing 305. Such an optical connector is superior in ease of heat dissipation of the optical element 302 to the optical connector 301 in which the connector housing 305 is formed from resin having a poor heat transfer characteristic.

As has been described, according to the optical element holding structure of the shielding case of the invention, a clearance existing between an internal circumferential surface of a case main body section and an outer circumferential surface of an element main body section, exclusive of the position of a window for optical communication formed in the case main body section, is filled with thermal conductive material assuming the form of a gel or liquid, and the thus-filled thermal conductive material is set. Heat developing in the element main body section is efficiently transferred to the case main body section by way of the thermal conductive material. The optical element holding structure is advantageously superior in countermeasures against noise and heat.

Provided integrally on or separately from at least one side surface of an internal circumferential surface of a case main body section is a spring piece section for pressing an element main body section against another side surface of the internal circumferential surface. Even such a construction yields an advantage of the heat developing in the element main body section being efficiently transferred to the spring piece section for exerting a pressing force and to the case main body section against which the element main body section is pressed. Thus, the shielding case is superior in countermeasures against noise and heat.

The spring piece section is provided at a position on the internal circumferential surface opposing the window section for optical communication formed in the case main body section. A distance between the optical element and an optical fiber to be connected to the optical connector can be shortened greatly, thereby yielding an advantage of an improvement in stability of optical communication.

The portion of the element main body section to be pressed by the spring piece section corresponds to a neighborhood of a heat source of the element main body section. Heat transfer is more effectively performed, thereby further enhancing a heatsinking effect.

The spring piece section is provided in the case main body section in a collapsed and extended manner by way of the opening edge section into which the element main body section of the case main body section is fitted. Such a structure yields an advantage of the ability to exhibit a more favorable electromagnetic shielding function.

A clearance existing between an internal circumferential surface of a case main body section and an outer circumferential surface of an element main body section, exclusive of the position of an optical communication window formed in the case main body section, is filled with thermal conductive material assuming the form of a gel or liquid, and the thus-filled thermal conductive material is set. Such a structure yields an advantage of the ability to perform heat transfer more effectively to thereby further enhance a heatsinking effect.

Further, an elastic member is interposed in a compressed state in the clearance existing between the internal circumferential surface of the case main body section and the outer circumferential surface of the element main body section, exclusive of the position of a window for optical communication formed in the case main body section. Even in this case, heat transfer is performed more effectively, thereby further enhancing the heatsinking effect.

The Fourth Preferred Embodiment-

The construction of a mount section of an optical connector according to an embodiment of the invention will be described hereinbelow.

Figure 26:
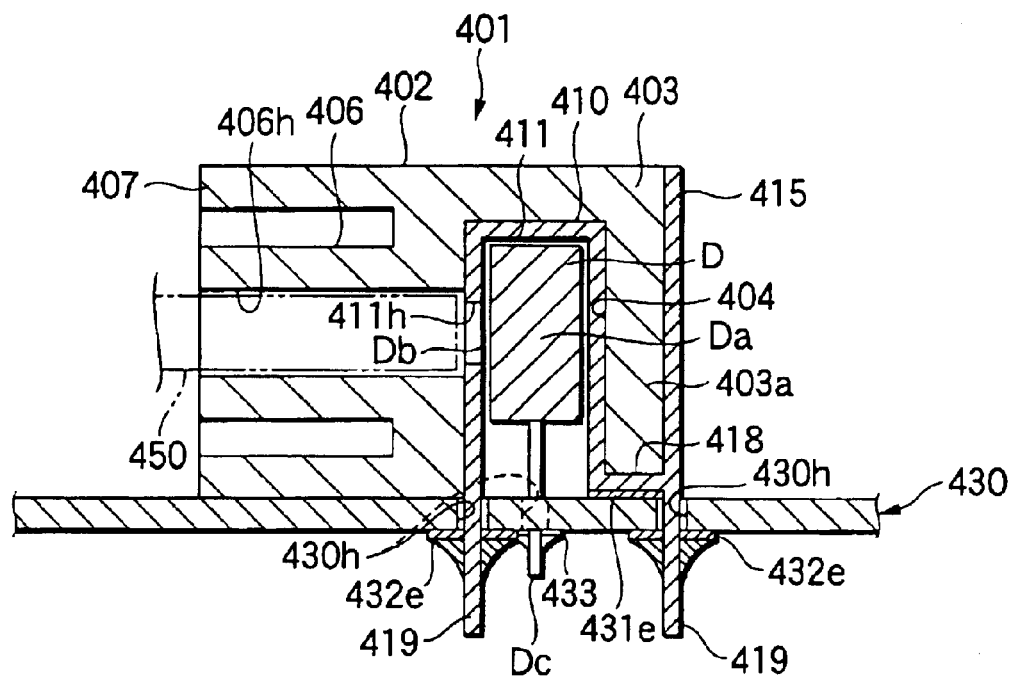
FIG. 26 is a cross-sectional view showing the construction of a mount section of an optical connector according to an embodiment of the invention.

As shown in FIG. 26, the mount section of an optical connector has a construction to be used for mounting, on a mount board 430, an optical connector 401 having incorporated therein optical elements D, such as a light-emitting element and a light-receiving element.

The optical connector 401 comprises a connector housing 402 formed from insulation material, such as resin, and a metal shielding shell 410 made of metal material.

A housing recess section 404 which is open at a bottom thereof is formed in the connector housing 402.

More specifically, the housing recess section 404 is formed in a housing main body section 403 located in the rear part of the connector housing 402, and guide sleeve sections 406 are formed in the connector housing 402 so as to protrude forward from the forward part of the main body section 403.

The housing recess section 404 is open in the bottom surface of the main body section 403. An element housing case section 411 (to be described later) of the metal shielding shell 410 is to be housed in the housing recess section 404 by way of the opening formed in the bottom.

Of the housing main body section 403, a bottom surface of a rear wall section 403a of the housing recess section 404 recedes from the remaining bottom surface of the connector housing 402. While the connector housing 402 is mounted on the mount board 430, a ground piece 418 (to be described later) can be interposed between the bottom surface of a rear wall section 403a and an upper surface of the mount board 430.

Each of the guide sleeve sections 406 is formed in a substantially-cylindrical member projecting forward of the main body section 403. Formed in the guide sleeve section 406 is a guide hole 406h which enables insertion of a ferule 450 of a mating optical connector. The guide hole 406h is in communication with the housing recess 404. When the ferrule 450 is inserted into any of the guide sleeve sections 406, an end face of an optical fiber held in the ferrule 450 is positioned so as to oppose an optical coupling section Db of the optical element D housed in the housing recess 404 (i.e., an optical light-emitting plane or an optical light-receiving plane). As a result, optical coupling is established between the optical fiber and the optical element D.

The guide sleeve sections 406 are enclosed by a substantially-angularly-cylindrical protective wall section 407 while being spaced a given interval away from each other.

Figure 27:
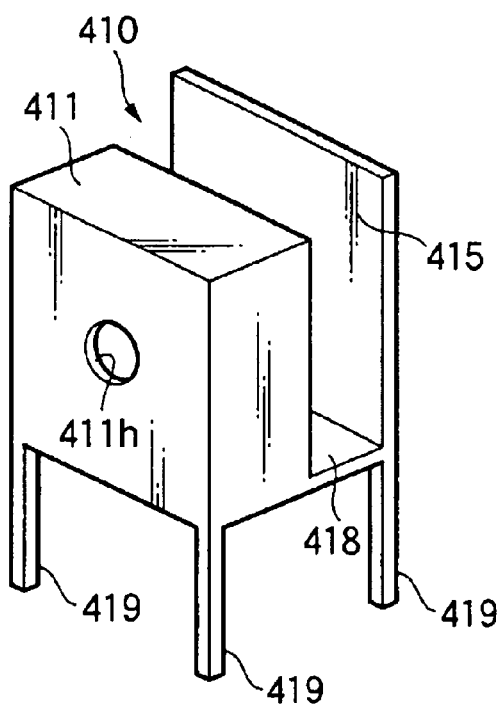
FIG. 27 is a perspective view showing a metal shielding shell according to the optical connector.

As shown in FIGS. 26 and 27, the metal shielding shell 410 is formed by means of punching and bending, e.g., a metal plate, as required. The element housing case 411 capable of housing the optical element D, a heatsink section 415, and a grounding piece 418 are formed into a single piece.

The element housing case 411 is formed so as to be able to be housed in the connector housing 402 while housing the optical element D therein.

More specifically, the element housing case section 411 is formed into substantially the shape of a box capable of housing the entirety of an element main body Da of the optical element D. The bottom surface of the element housing case section 411 is open. The element main body section Da is inserted and housed in the element housing case section 411 by way of the opening formed in the bottom thereof A window section 411h is formed in a front surface of the element housing case section 411. The optical coupling section Db of the element main body section Da (i.e., the light-emitting plane of the light-emitting element or the light-receiving plane of the light-receiving element) faces outside by way of the window section 411h.

The grounding piece 418 is formed into the shape of a plate extending along the bottom surface of the connector housing 402.

In the embodiment, the grounding piece 418 is provided so as to extend along the bottom surface of the rear wall section 403a of the housing recess section 404. While the connector housing 402 is mounted on the mount board 430, the grounding piece 418 is interposed between the bottom surface of the rear wall section 403a and the mount board 430. Further, a lower surface of the grounding piece 418 is formed so as to be able to come into plane contact with a predetermined ground trace 431e formed on the upper surface of the mount board 430.

More specifically, the heatsink section 415 is formed such that at least a part of the heatsink section 415 is exposed outside of the connector housing 402.

Specifically, the heatsink section 415 is formed into the shape of a substantially-square plate corresponding to the back of the connector housing 402. The heatsink section 415 is spaced a predetermined interval from and in parallel with the back of the element housing case 411. A lower edge of the heatsink section 415 and a lower edge of the back of the element housing case 411 are joined together at the bottom surface of the rear wall section 403a by means of the grounding piece 418.

Lead terminals 419 project downward at right angles from the four corners of the metal shielding shell 410. While the metal shielding shell 410 is attached to the connector housing 402, the lead terminals 419 project downward from the connector housing 402 and can be soldered to the mount board 430.

The mount board 430 is a well-known board on which predetermined traces are formed from copper foil. As shown in FIG. 26, a ground trace 431e is formed in an area assigned to the grounding piece 418 on one surface of the mount board 430 (i.e., an upper surface side of the mount board 430 shown in FIG. 26) within the area in which the optical connector 401 is to be mounted. Formed in the area in which the optical connector 401 is to be mounted are through holes 430h which enable insertion of a lead terminal Dc of the optical element D and the lead terminals 419 of the metal shielding shell 410. Another predetermined ground trace 432e and a signal trace 433 are formed on the other surface side of the mount board 430 (i.e., a lower surface of the mount board 430 shown in FIG. 26).

The optical connector 401 is assembled in the manner set forth and mounted on the mount board 430.

First, while the optical element D is housed in the element housing case section 411 of the metal shielding shell 410, the element housing case section 411 is inserted into the housing recess 404, and the heatsink section 415 is provided along the back of the connector housing 402. The metal shielding shell 410 is inserted into the connector housing 402 from below until the grounding piece 418 contacts the bottom surface of the rear wall section 403a, thus completing assembly of the connector housing 402.

Next, the lead terminals 419 of the metal shielding shell 410 and the lead terminal Dc of the optical element D are inserted into the corresponding through holes 43 Oh. When the optical connector 401 is mounted within a predetermined mount area on the mount board 430, the grounding piece 418 comes into plane contact with the ground trace 431e provided on the mount board 430. In this state, the lead terminals 419 projecting beyond the lower surface of the mount board 430 are soldered to the ground trace 432e, and the lead terminal Dc is soldered to the signal trace 433, whereby the optical connector 401 is fixedly mounted on the mount board 430.

By means of the construction of the mount section of the optical connector 401, the metal shielding shell 410 is grounded by way of the plane contact existing between the grounding piece 418 and the ground trace 431e, as well as by way of the soldered portion existing between the lead terminals 419 and the ground trace 432e.

Figure 31:
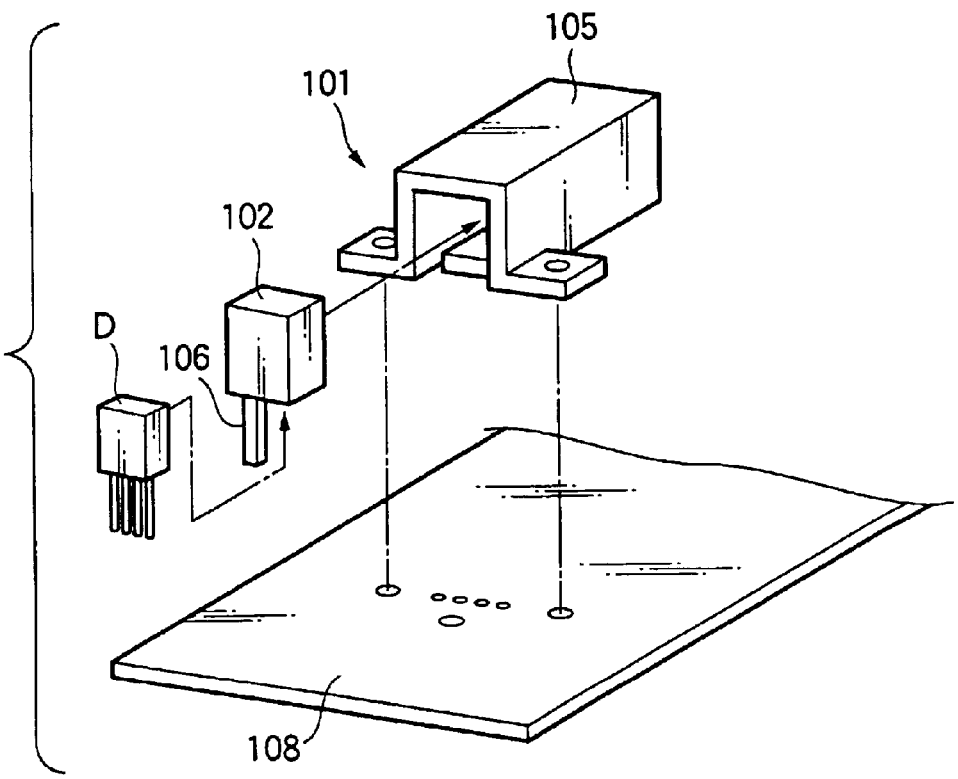
FIG. 31 is an exploded perspective view showing a first background art.
Figure 32:
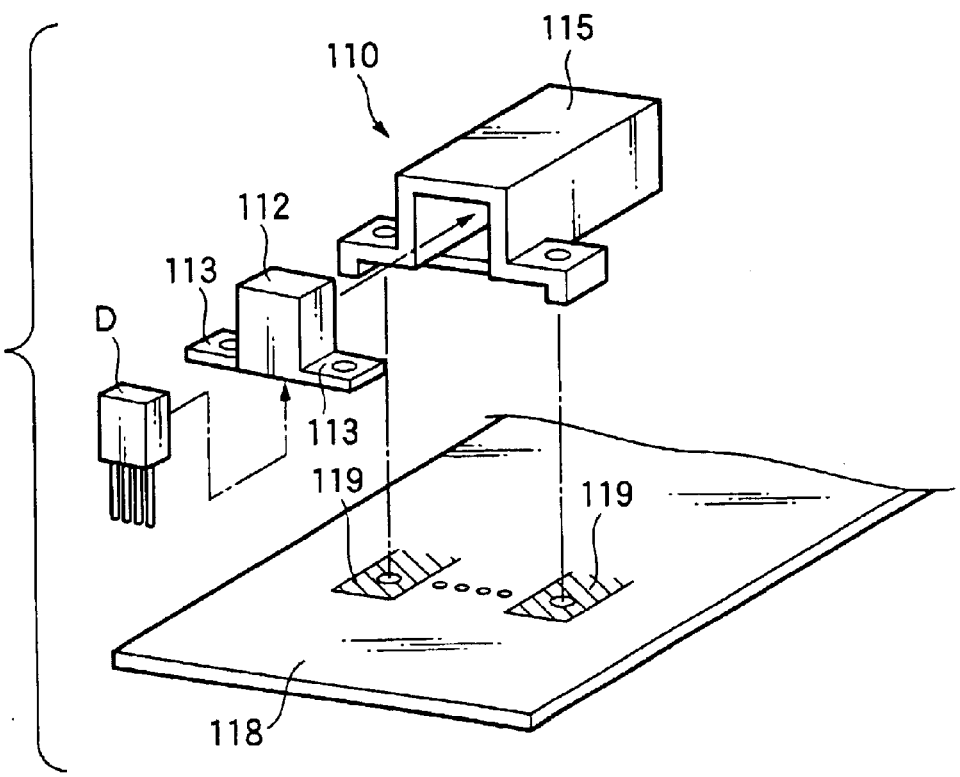
FIG. 32 is an exploded perspective view showing a second background art.

By means of the construction of the mount section of the optical connector 401 configured in the manner mentioned above, the plate-like grounding piece 418 that is provided so as to extend along the bottom surface of the connector housing 402 is formed integrally in the element housing case section 411. The metal shielding shell 410 is grounded by way of the grounding piece 418. As compared with the related-art example shown in FIG. 31 in which an optical connector is grounded by way of only a pin-shaped lead terminal, the optical connector of the invention can minimize ground resistance.

In pursuant to the embodiment, the grounding piece 418 is brought into plane contact with the ground trace 43 1e formed on one surface of the mount board 430. By means of a configuration of plane contact, contact resistance developing between the grounding piece 418 and the ground trace 431e can be reduced, thus minimizing ground resistance.

In the embodiment, the lead terminals 419 of the metal shielding shell 410 are formed and soldered to the ground trace 432e. However, the lead terminals 419 may be omitted.

In the metal shielding shell 410, the heat developing in the optical element D is in principle transferred from the element housing case section 411 to the heatsink section 415 by way of the grounding piece 418. The heat is then dissipated outside from the heatsink section 415. In the embodiment, the grounding piece 418 remains in plane contact with the ground trace 431e, and hence the heat developing in the optical element D is also transferred from the element housing case section 411 to the trace 431e by way of the grounding piece 418. The heat is then dissipated outside from the trace 431e. Hence, the optical element D is also superior in a heatsink characteristic.

Since the grounding piece 418 is provided so as to extend along the bottom surface of the connector housing 402, the grounding piece 418 does not jut outward of the connector housing 402. Hence, the area required for mounting the optical connector 401 can be minimized. Further, the construction of the connector housing 402 can be simplified. Hence, a die employed for manufacturing the connector housing 402 can also be simplified.

In the embodiment, the heatsink section 415 may be omitted.

In the embodiment, the grounding piece 418 is a member to be used for coupling the element housing case section 411 with the heatsink section 415 at the bottom surface of the connector housing 402. By utilization of the grounding piece 418 by way of which the element housing case section 411 and the heatsink section 415 are coupled together, the metal shielding shell 410 can be grounded efficiently.

Figure 28:
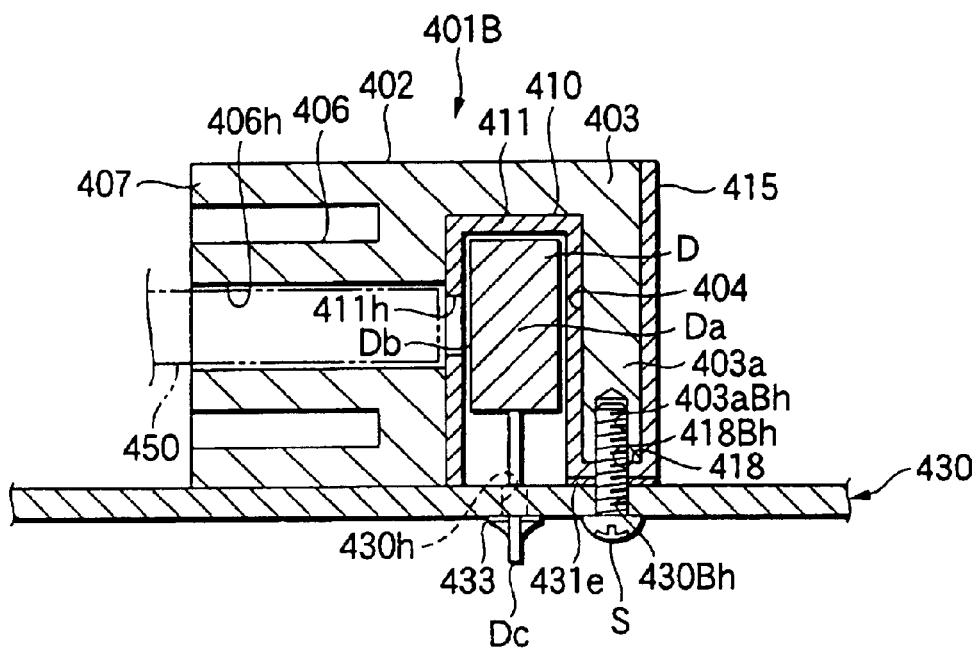
FIG. 28 is a cross-sectional view showing the construction of a mount section of an optical connector according to a first modification.

Like the construction of a mount section of an optical connector 401B according to a first modification shown in FIG. 28, a screw through hole 418Bh is formed in the grounding piece 418, and a screw through hole 430Bh is formed in the mount board 430. A screw hole 403aBh is formed in the bottom of the rear wall section 403a of the housing recess 404 of the connector housing 402. A screw S is inserted into the screw insertion holes 430Bh, 418Bh from below the lower surface of the mount board 430. The thus-inserted screw S is screw-engaged with a screw hole 403aBh and may be fastened so as to bring the grounding piece 418 into pressing contact with the ground trace 431e. In this case, the screw S is to be used for bringing the grounding piece 418 into pressing contact with the ground trace 431e. Hence, the screw S may be made of metal or resin.

Although the first modification omits the lead terminals 419 and the corresponding through holes 430*h*, they may be retained.

In the first modification, the grounding piece 418 and the ground trace 431*e* are forcibly brought into pressing contact with each other by means of fastening force of the screw S. For this reason, ground resistance can be made much lower.

Figure 29:
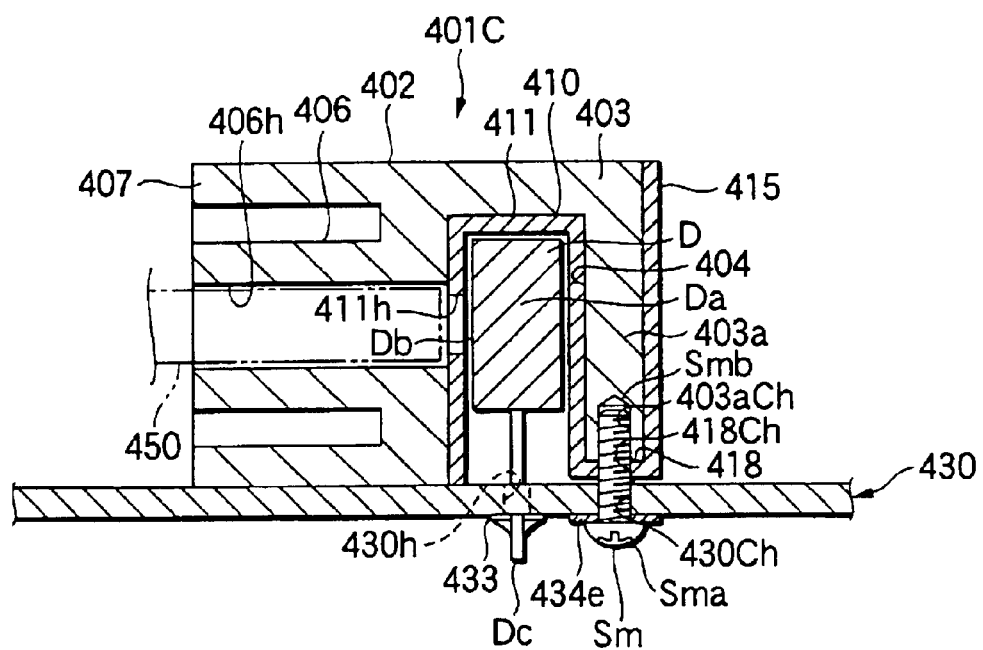
FIG. 29 is a cross-sectional view showing the construction of a mount section of an optical connector according to a second modification.

Like a mount section of an optical connector 401C according to a second modification shown in FIG. 29, a metal screw Sm is brought into electrical contact with the grounding piece 418, as well as with a ground trace 434*e* formed on the lower surface of the mount board 430. In this case, the screw Sm may be inserted into the mount board 430 and the grounding piece 418 from the lower surface of the mount board 430 and fastened to the connector housing 402.

More specifically, a screw insertion hole 430Ch is formed in the mount board 430, and a screw hole 418Ch is formed in the grounding piece 418. Further, a screw hole 403*a*Ch is formed in the bottom of the rear wall section 403*a* of the housing recess 404 in the connector housing 402. The ground trace 434*e* is formed in the area surrounding the screw hole 403*a*Ch on the lower surface of the mount board 430. The metal screw Sm is screwed and fastened, from the lower surface of the mount board 430, to the screw hole 418Ch and the screw hole 403*a*Ch by way of the screw insertion hole 430Ch.

In the second modification, the metal shielding shell 410 is electrically connected as a result of the metal screw Sm being screw-engaged with the screw hole 418Ch. Further, a portion of a screw head Sma of the metal screw Sm close to a screw shaft Smb is brought into plane contact with and electrically connected to the ground trace 434*e*. Hence, the grounding piece 418 is connected to the trace 434*e* and grounded by way of the metal screw Sm having a comparatively large diameter.

As compared with the related-art example in which the optical connector is grounded by way of only the pin-shaped lead terminal, the second modification also enables minimization of ground resistance.

In place of the construction which has been described in connection with the embodiment and in which the grounding piece 418 is brought into plane contact with and grounded by way of the ground trace 431*e* provided on the mount board 430, the second modification employs a construction in which the grounding piece 418 is connected to the ground trace 434*e* by way of the metal screw Sm and is thus grounded. As a matter of course, both constructions can be adopted.

In the embodiment, an optical connector mounted on a mount board was actually manufactured. The optical connector was subjected to an immunity test.

Objects of the test were an optical connector grounded (plane-grounded type) by means of bringing the grounding piece 418 into plane contact with the ground trace 431*e* in the manner as described in connection with the embodiment, and an optical grounded (screw-grounded type) by way of the metal screw Sm in the manner as mentioned in connection with the second modification. For the purpose of comparison, an optical connector similar to that described in connection with the embodiment but not grounded (non-grounded type) and an optical connector grounded (lead-terminal-grounded type) by way of only one lead terminal 419 were also subjected to an immunity test.

The tests were conducted in accordance with the TEM cell method under specified conditions; namely, a frequency range of 430 through 350 MHz, an applied electro-magnetic field of 200 V/m, and 80% AM modulation.

Figure 30:
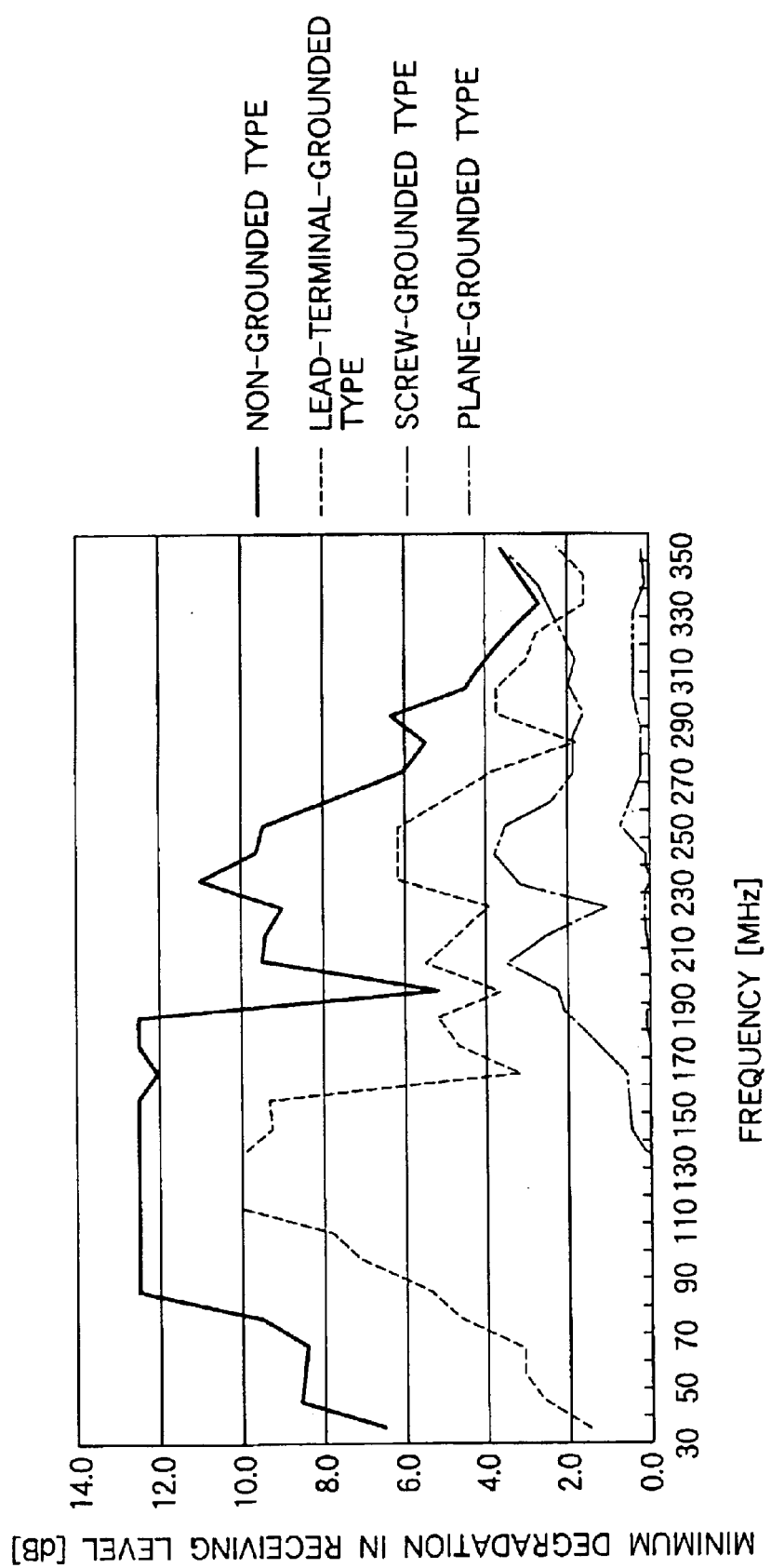
FIG. 30 is a plot showing results of an immunity test.

As shown in FIG. 30, the optical connector of screw-grounded type was improved in degradation of receiving level as compared with the optical connector of lead-terminal-grounded type corresponding to the related-art optical connector and the optical connector of non-grounded type. The optical connector of plane-grounded type was improved as compared with the optical connector of screw-grounded type. The test results show that sufficient electromagnetic shielding effect was achieved by virtue of a reduction in ground resistance.

By means of the structure of the mount section of the optical connector according to this embodiment constructed in the manner mentioned previously, a plate-like grounding piece which is provided so as to extend along a bottom surface of a connector housing is formed integrally in an element housing case. A metal shield shell is grounded by way of the grounding piece. Hence, as compared with a related-art example in which an optical connector is grounded by way of only a pin-shaped lead terminal, the optical connector can minimize ground resistance.

The grounding piece is provided so as to extend along the bottom surface of the connector housing. Hence, the grounding piece does not jut out from the connector housing. Further, an area required for fixedly mounting the optical connector can also be minimized.

By means of the construction of the mount section of the optical connector according to this embodiment, the metal shielding shell is grounded efficiently by means of utilization of the element housing case section and the heatsink section.

As described in this embodiment, the grounding piece is brought into plane contact with a ground trace formed on one side of a mount board, thereby diminishing resistance existing between the grounding piece and the ground trace and minimizing ground resistance.

In this case, as described in this embodiment, a screw is inserted into the mount board and the grounding piece from the other side of the mount board and screw-engaged with the connector housing by means of fastening. By means of the fastening force of the screw, the grounding piece and the ground trace are forcibly brought into contact with each other, thereby diminishing ground resistance to a much greater extent.

As described in this embodiment, a metal screw is brought into electrical contact with the ground trace formed on the other side of the mount board and into electrical contact with the grounding piece. In this state, the metal screw is inserted into the mount board and the ground piece from the other side of the mount board and screw-engaged with the connector housing by means of fastening. By way of the metal screw, the metal shielding shell can be electrically connected to the ground trace while involving much lower ground resistance.

By means of the optical connector according to the invention, a plate-like grounding piece which is provided so as to extend along the bottom surface of the connector housing formed on the mount board and which is electrically connectable to the ground trace is formed integrally in an element housing case section. As compared with the related-art optical connector which is grounded by means of only a pin-shaped lead terminal, the optical connector can minimize ground resistance.

The grounding piece is provided so as to extend along the bottom surface of the connector housing. Hence, the grounding piece does not jut out from the connector housing, and the area required for fixedly mounting the optical connector can be minimized.

What is claimed is:

1. A structure of a mount section of an optical connector comprising:

a connector housing in which a housing recess section is formed so as to open in a bottom surface, and a shielding shell housed in the housing recess section, the shielding shell having an element housing case section for holding an optical element, wherein the connector housing comprises a grounding piece shaped as a plate extending along the bottom surface of the connector housing, the grounding piece formed integrally with the element housing case section; and the grounding piece is disposed between the connector housing and one surface of a mount board to electrically connect to a ground trace formed on the mount board while the optical connector is mounted on the one surface of the mount board.

2. The structure of a mount section of an optical connector according to claim 1, wherein the shielding shell has a heatsink section exposed outside of the connector housing;

the grounding piece connects the element housing case section to the heatsink section.

3. The structure of a mount section of an optical connector according to claim 1, wherein the grounding piece is in plane contact with a ground trace formed on the one side of the mount board.

4. The structure of a mount section of an optical connector according to claim 3, further comprising:

a screw inserted into the mount board and the grounding piece from the other side of the mount board to be screwed with the connector housing.

5. The structure of a mount section of an optical connector according to claim 1, further comprising:

a metal screw, connected to the grounding piece on one side of the mount board, wherein the metal screw is inserted into the mount board and the grounding piece from the other side of the mount board to be screwed with the connector housing, and the metal screw is connected to the ground trace formed on the other side of the mount board.

6. An optical connector comprising:

a connector housing in which a housing recess section is formed so as to open in a bottom surface, a metal shielding shell housed in the housing recess section, the metal shielding shell having an element housing case section for holding an optical element, and a grounding piece formed integrally with the housing case section and provided on a bottom surface of the connector housing, wherein the grounding piece is capable of being electrically connected to a ground trace formed on a mount board.

* * * * *